(12) United States Patent
Khan et al.

(10) Patent No.: US 10,668,382 B2
(45) Date of Patent: Jun. 2, 2020

(54) AUGMENTING VIRTUAL REALITY VIDEO GAMES WITH FRIEND AVATARS

(71) Applicant: Sony Interactive Entertainment America LLC, San Mateo, CA (US)

(72) Inventors: Mohammed Khan, San Mateo, CA (US); Matt DeVico, San Mateo, CA (US); Shawn He, San Mateo, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 157 days.

(21) Appl. No.: 15/905,796

(22) Filed: Feb. 26, 2018

(65) Prior Publication Data

US 2019/0099675 A1 Apr. 4, 2019

Related U.S. Application Data

(60) Provisional application No. 62/566,272, filed on Sep. 29, 2017.

(51) Int. Cl.
*A63F 13/655* (2014.01)
*A63F 13/5255* (2014.01)
(Continued)

(52) U.S. Cl.
CPC .......... *A63F 13/655* (2014.09); *A63F 13/211* (2014.09); *A63F 13/212* (2014.09);
(Continued)

(58) Field of Classification Search
None
See application file for complete search history.

(56) References Cited

U.S. PATENT DOCUMENTS

2002/0171647 A1* 11/2002 Sterchi .................... G06T 13/40
345/473
2011/0244954 A1 10/2011 Goldman et al.
(Continued)

FOREIGN PATENT DOCUMENTS

| EP | 1391847 A1 | 2/2004 |
|---|---|---|
| EP | 2492872 A1 | 8/2012 |

OTHER PUBLICATIONS

Will Porter_A videogame history of bullet-time_gamesradar.com_4 pages.

(Continued)

*Primary Examiner* — James S. McClellan
*Assistant Examiner* — Peter J Iannuzzi
(74) *Attorney, Agent, or Firm* — Penilla IP, APC

(57) ABSTRACT

Methods and systems are provided for augmenting a video game with an avatar of a real world person. A method provides for executing a video game being played by a user via a head mounted display (HMD). The method includes operations for identifying a generic spectator within the video game and determining virtual coordinates associated with the generic spectator. The method also provides receiving data associated with an avatar of a real world person that is usable to display the avatar within the video game in three-dimensional (3D) form. The method provides removing the generic spectator from view within the video game and inserting the avatar into the video game at the virtual coordinates associated with the generic spectator. The method further provides rendering a virtual reality (VR) presentation of the video game for the user having a view of the avatar and sending the VR presentation to an HMD of the user for display.

20 Claims, 15 Drawing Sheets

(51) Int. Cl.
   *A63F 13/25* (2014.01)
   *A63F 13/803* (2014.01)
   *A63F 13/86* (2014.01)
   *A63F 13/795* (2014.01)
   *A63F 13/355* (2014.01)
   *A63F 13/212* (2014.01)
   *A63F 13/211* (2014.01)
   *A63F 13/213* (2014.01)
   *A63F 13/26* (2014.01)
   *A63F 13/352* (2014.01)
   *A63F 13/812* (2014.01)

(52) U.S. Cl.
   CPC ............ *A63F 13/213* (2014.09); *A63F 13/25* (2014.09); *A63F 13/26* (2014.09); *A63F 13/352* (2014.09); *A63F 13/355* (2014.09); *A63F 13/5255* (2014.09); *A63F 13/795* (2014.09); *A63F 13/803* (2014.09); *A63F 13/812* (2014.09); *A63F 13/86* (2014.09); *A63F 2300/5553* (2013.01); *A63F 2300/8082* (2013.01)

(56) References Cited

U.S. PATENT DOCUMENTS

| | | | | |
|---|---|---|---|---|
| 2012/0302351 | A1* | 11/2012 | Murphy | A63F 13/12 463/42 |
| 2014/0033044 | A1* | 1/2014 | Goldman | G06Q 30/02 715/727 |
| 2018/0104580 | A1* | 4/2018 | Humadi | A63F 13/335 |

OTHER PUBLICATIONS

Edwin Evans-Thirlwell_ How video games win back time_eurogamer.net/articles/2017-08-26_on games as time travel machines_3 pages.
Van Ekelenburg, Jacqueline_PCT/2018/053127_Notification of Transmittal of the Intentional Search Report and the Written Opinion of the International Searching Authority, or the Declaration_ISA/220_ISA/210_ISA/237_dated Feb. 28, 2019_18 pages.

* cited by examiner

US 10,668,382 B2

AUGMENTING VIRTUAL REALITY VIDEO GAMES WITH FRIEND AVATARS

CLAIM OF PRIORITY

This application is a non-provisional application of U.S. Provisional Application No. 62/566,272, filed Sep. 29, 2017, entitled "AUGMENTING VIRTUAL REALITY VIDEO GAMES WITH FRIEND AVATARS," which is herein incorporated by reference.

FIELD OF THE DISCLOSURE

The present disclosure relates generally to presentations of virtual reality (VR) video games, more particularly to methods and systems for augmenting VR video games with avatars of friends and generating views of friend-augmented video games for display on head mounted displays (HMDs) associated with players.

BACKGROUND

Many video games are programmed to include generic or "fake" spectators. Generic spectators can make video game scenes more realistic when a video game scene is associated with a real world context in which spectators would be expected. However, as video games become more and more realistic and life-like, the aspect of generic spectators displayed within video games has not kept pace. Current generic spectators may detract from realistic and life-like video game content.

It is in this context that embodiments arise.

SUMMARY

Embodiments of the present disclosure relate to methods and systems augmenting a video game with an avatar of a real world person. In one embodiment, a method includes an operation for executing the video game at a server, the video game being played by a user via a head mounted display (HMD). The method also includes operations for identifying a generic spectator within the video game and for determining virtual coordinates associated with the generic spectator. The method provides an operation for receiving, at the server, data associated with the avatar, the data usable to display the avatar within the video game. Further, the method provides operations for removing the generic spectator from view in the video game and inserting the avatar of the real world person into the video game at the virtual coordinates associated with the generic spectator using the data associated with the avatar. The inserting the avatar causes the avatar to be viewable within the video game in a three-dimensional (3D) form. Moreover, the method includes operations for rendering a VR presentation of the video game for the user and sending the VR presentation to the HMD of the user for display. According to this and other embodiments, the VR presentation includes a view of the avatar.

In another embodiment, a server system or data center having one or more server systems are provided that comprises one or more processors and a memory disposed in communication with the one or more processors. The memory stores processor-executable instructions to execute a video game for play by a user via an HMD. The memory further stores instructions to identify a generic spectator within the video game and to determine virtual coordinates associated with the generic spectator. The memory further includes instructions to receive data associated with the avatar of a real world person that is usable to display the avatar within the video game and to remove the generic spectator from view in the video game. The memory further includes instructions to insert the avatar into the video game at the virtual coordinates associated with the generic spectator using the data associated with the avatar to cause the avatar to be viewable within the video game in 3D form. In some embodiments, the data associated with the avatar includes 3D vertex data that may be used to draw and render the avatar. The system also provides that the memory includes instructions to render a virtual reality (VR) presentation of the video game for the user that includes a view of the avatar in the 3D form and to send the VR presentation to the HMD of the user for display.

In yet another embodiment, a computer program stored in a non-transitory medium for storing processor-executable instructions is provided. The computer program includes instructions to execute a video game for play by a user via an HMD. The computer program provided also includes instructions to identify a generic spectator within the video game, to determine virtual coordinates associated with the generic spectator, and to receive data associated with the avatar of the real world person that is usable for displaying the avatar within the video game. The computer program provided also includes instructions to remove the generic spectator from view in the video game and to insert the avatar into the video game at the virtual coordinates associated with the generic spectator using the data associated with the avatar to cause the avatar to be viewable within the video game in a 3D form. Furthermore, the computer program includes instructions to render a VR presentation of the video game for the user including a view of the avatar in 3D form and send the VR presentation to the HMD of the user for display.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

The following embodiments describe methods, computer programs, and apparatuses for augmenting video games of players with avatars of friends in place or in addition to existing generic, "fake" spectators. It will be obvious, however, to one skilled in the art, that the present disclosure may be practiced without some or all of these specific details. In other instances, well known process operations have not been described in detail in order to not unnecessarily obscure the present disclosure.

Many types of video games are programmed to display "fake" spectators to enhance the realness and playability of the game. For example, it is much more natural and appealing to some players to play a game of basketball in front of an auditorium full of spectators than it is an auditorium full of empty seats. The same is true for certain racing games, team sports, combats sports, and a variety of other categories of video games. There is a dimension of realness that is brought to the gaming experience by rendering generic or "fake spectators" in situations where one would expect there to be spectators in the real world.

However, as video games become increasingly realistic and life-like, generic spectators have not kept pace. What would otherwise be a realistic and life-like video game scene may be detracted from by the presence of current generic spectators. For example, current generic spectators are typically rendered to be nondescript and unrecognizable (e.g., generic spectators are often rendered with blurry facial features). Moreover, current generic spectators do not represent persons or friends from the real world that a player may wish to see as the player interacts with the video game. For example, it is much more effective and appealing to be cheered on by friends than it is to be cheered on by "fake" spectators. Thus, there is an opportunity and advantage to provide a more appealing and realistic gaming experience by augmenting certain video games with friend avatars in place of or in addition to fake spectators, as being able to see your friends cheer you on or react to your gameplay provides for a more entertaining and engaging gaming experience.

Moreover, there is an opportunity to provide spectator views of the video game being played to a friend whose friend avatar has been inserted into a video game. These spectator views may be provided either in real-time as the player navigates the video game, or may be stored for subsequent view. As a result, a layer of social connectivity may be provided as a result of the methods and system presented here, which ultimately provide for a greater level of engagement and entertainment for the player and the player's friends.

As used herein, "generic spectators" are taken to mean "fake" spectators, non-player characters, non-person characters, or any other character that is not associated with a real world person.

Figure 1:
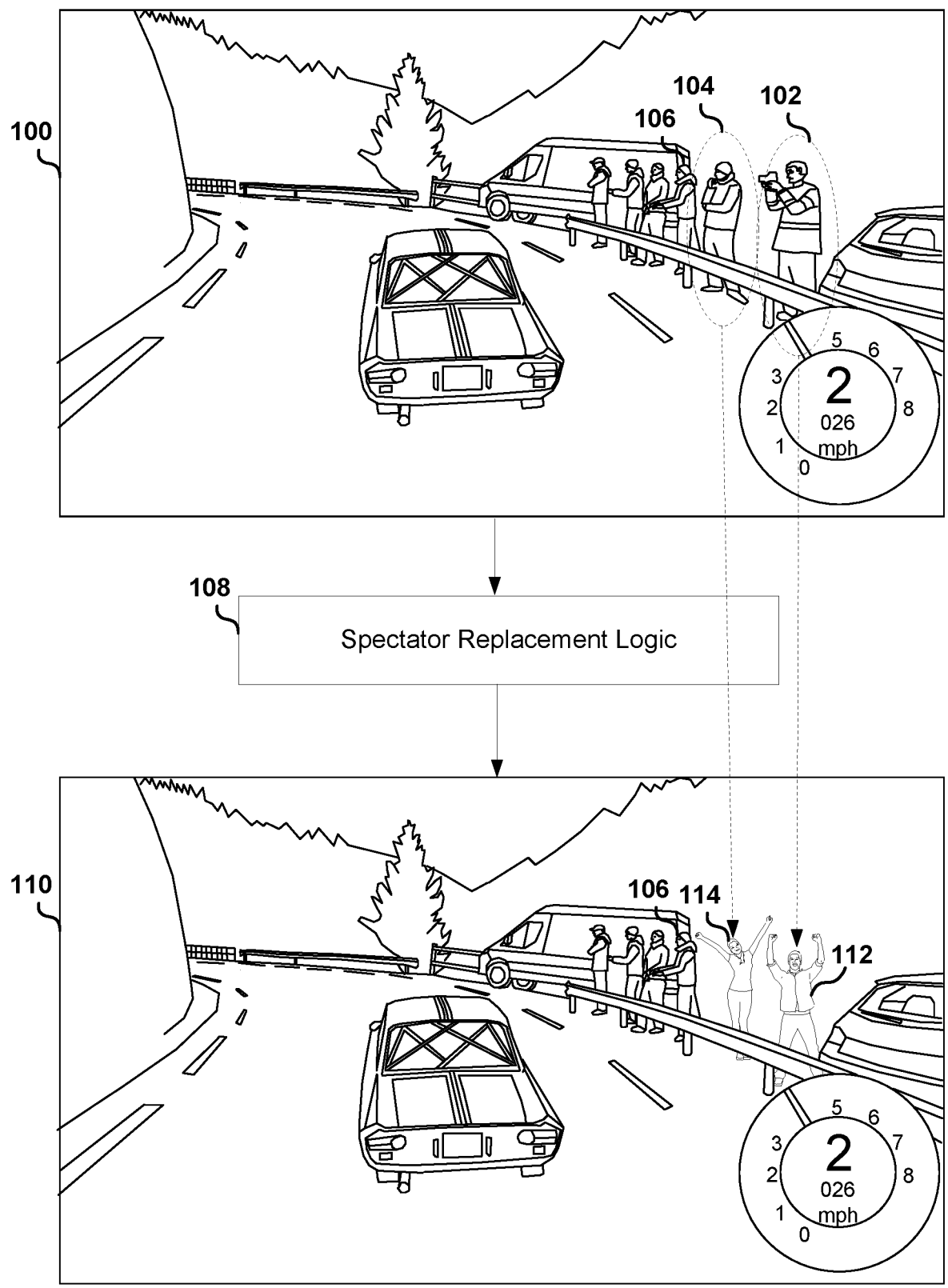
FIG. 1 is a conceptual illustration of an embodiment of augmenting a virtual reality (VR) video game with friend avatars that includes replacing existing generic spectators with friend avatars.

FIG. 1 is a conceptual illustration of an embodiment for augmenting a virtual reality (VR) video game with friend avatars using spectator replacement logic 108. A first VR scene 100 of the VR game is shown include a racing game having a number of generic spectators, including a first generic spectator 102, a second generic spectator 104, and a third generic spectator 106. In the second VR scene 110 of the same VR game, the spectator replacement logic 108 is shown to have replaced the first generic spectator 102 with first friend avatar 112 and the second generic spectator 104 with second friend avatar 114. The third generic avatar 106 is shown to remain unchanged.

In some embodiments, the friend avatars 112 and 114 are real-time representations of friends that are watching VR game as a player plays it. In other embodiments, the friend avatars 112 and 114 may be pre-programmed clips of friends associated with the friend avatars 112 and 114, which are then rendered during execution of the VR game. In the embodiment of FIG. 1, friend avatars 112 and 114 are shown to be life-like representations of the associated friends. That is, the friend avatars 112 and 114 appear as the associated friends would in the real world. In other embodiments, friend avatars need not resemble the associated friend, but may take on any form of the associated friend's choosing. For example, the associated friend may choose a character they like to be their friend avatar, or may render their own friend avatar. In either case, a production value and appeal of the VR game is increased by inserting the friend avatars 112 and 114 into the VR game because the VR game is made more personable, realistic, and engaging. As a result, augmentation of video games with avatars of real world persons such as friends represent an improvement to video game technology by enabling scenes of VR games to have spectators that a user recognizes and wishes to see.

In certain embodiments of video games, a player's movement within a virtual terrascape, a virtual world, or a virtual scene may occur fast enough such that it may be difficult to resolve or identify spectators that are standing still. For example, players often reach great enough speeds in racing games to make it difficult for the players to identify or make out individual spectators (e.g., spectators may become a "blur" to a player as the player speeds by the spectators). Thus, according to the embodiment shown, friend avatars 112 and 114 may only appear to the player for a period of about 0.1 seconds to about 2 seconds, which may not be long enough for the player of the racing game to recognize the friend avatars 112 and 114.

A number of embodiments are envisioned here that enable players to gain a better view and appreciation of friend avatars that are inserted into the player's video game. In one embodiment, the game engine or game module that executes the video game may be instructed to slow down 'virtual time' within the game momentarily in a way that allows the player to view the friend avatars 112 and 114 that have been inserted into the video game. That is, the video game may modulate a passage of 'virtual time' within the video game, causing the scene associated with the video game to appear in slow motion. It is contemplated that certain embodiments are able to slow down the passage of virtual time by a factor of anywhere between about 2× to about 5×, or between about 1.1× to about 100×. As a result, during the period of slowed virtual time, players may be able to view friend avatars and generic spectators for a longer period of 'actual time' (e.g., for anywhere between about 1 second to about 10 seconds, or between about 0.5 seconds to about 20 seconds, depending on various implementations.) After a period, the virtual time is increased back to normal (e.g., real-time).

In certain embodiments, a speed of presentation of the video game may be reduced while the avatar is viewable to the user. The speed of presentation of the video game may then be sped back up when the avatar is no longer viewable to the user. In other embodiments, the size of the avatars may be magnified so that the user may have a better view of the avatars in conjunction with the slowing down/speeding up the speed of presentation of the video game.

Figure 2:
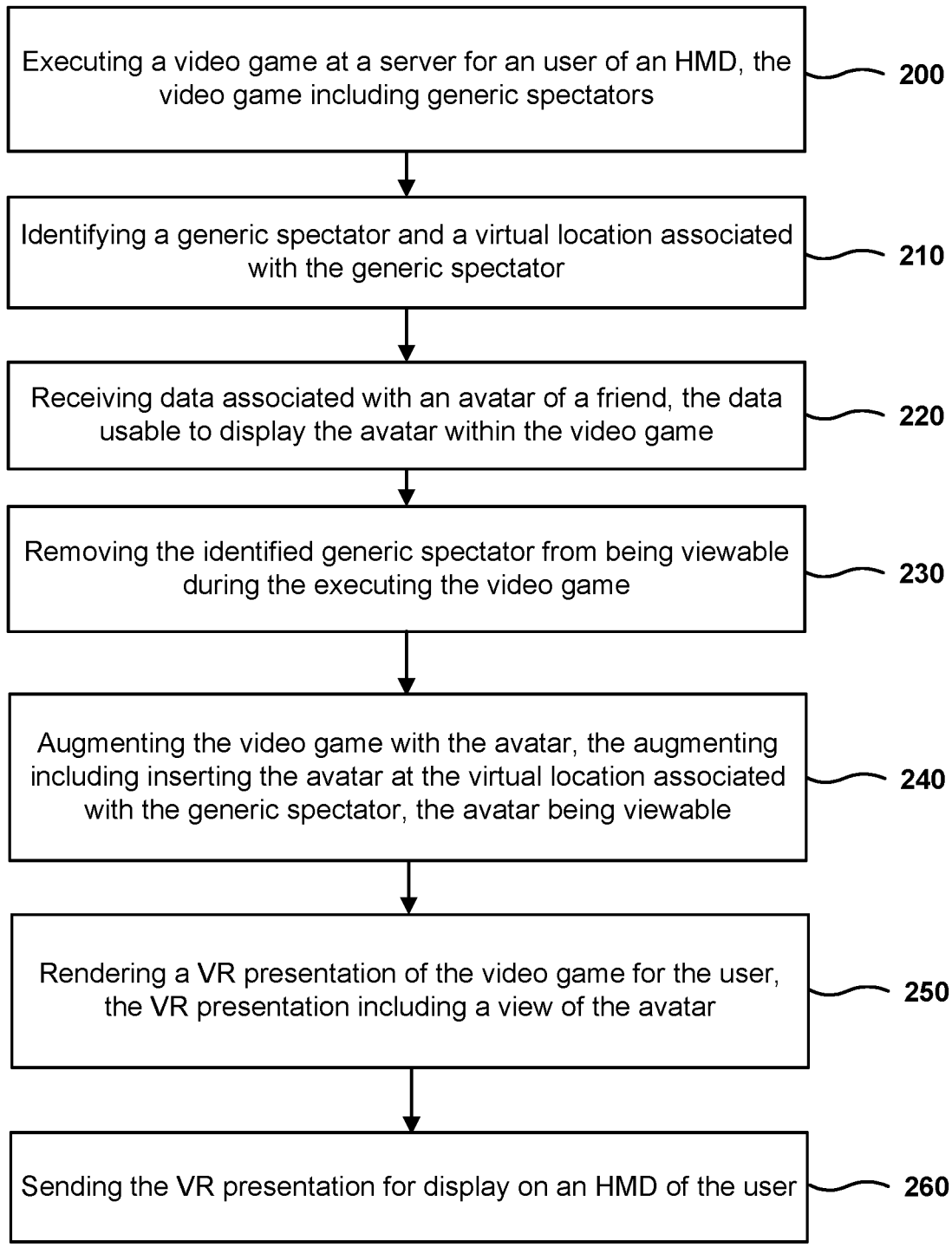
FIG. 2 shows an overall flow of a method for augmenting a VR video game with a friend avatar, according to one embodiment.

FIG. 2 shows an overall flow of a method for augmenting a VR video game with a friend avatar, according to one embodiment. The method begins with operation 200, which executes a video game at a server for a user of an HMD, the video game including generic spectators. At operation 210, the method identifies a generic spectator and a virtual location associated with the generic spectator. The method then flows to operation 220, which serves to receive data associated with the friend avatar, the data usable to display the avatar within the video game.

In operation 230, the method removes the identified generic spectator from being viewable during the executing the video game. Operation 240 then serves to augment the video game with the friend avatar, the augmenting including inserting the avatar at the virtual location associated with the generic spectator.

The method then flows to operations 250 and 260, which serve to render a VR presentation of the video game for the user, the VR presentation including a view of the avatar, and to send the VR presentation for display on the HMD of the user, respectively.

According to some embodiments, operation 210 may identify the generic spectator randomly. In other embodiments, operation 210 may identify the generic spectator according to how visible or prominent the generic spectator appears within the video game. Thus, according to these embodiments, operation 210 may identify generic spectators that appear more prominently within video game such that the friend avatar may also appear prominently to the player of the video game.

Furthermore, according to some embodiments, operations 210-240 may be repeated such that a plurality of generic spectators may be identified and replaced with the same friend avatar. In these embodiments, the player will be given multiple opportunities to view the friend avatar as the player plays the video game.

It is also contemplated that the identifying a generic spectator in operation 210 may occur based on how visible or prominent the generic spectator is with respect to a point of view of the user. For example, operation 210 may select generic spectators that are more likely to be visible to the user for replacing with avatars of friends. Thus, as shown in FIG. 1, generic spectators 102 and 104 may be selected over generic spectator 106 because generic spectators 102 and 104 are more visible within the first VR scene 100. As a result, once the generic spectators 102 and 104 are replaced with friend avatars 112 and 114, the latter will be more visible to the user.

It is also contemplated that the inserting the avatar into the video game may occur such that the avatar faces toward a general direction of a field of view of the user. For example, avatars that face a user's point of view are more recognizable than avatars that do not. As a result, operation 240 may, for example, insert the friend avatar at an orientation such that the friend avatar faces toward the user's field of view. FIG. 1 illustrates an embodiment in which friend avatars 112 and 114 are oriented such that they face the user's field of view. Further, avatars may also have their orientation changed or updated such that they are consistently facing the user if the user moves relative to the avatar. For example, in FIG. 1, both of friend avatars 112 and 114 may be configured to turn their heads and/or bodies to the right as the user moves past them.

In some embodiments, the data associated with the avatar may include facial data such that the avatar includes at least a virtual face that resembles the face of the real world person (e.g., friend) as identified from a social media network. In certain embodiments, the virtual face of the avatar may be constructed in 3D from 2-dimensional photos of the real world person using techniques well known in the art. In other embodiments, the virtual face of the avatar may be constructed using 3D imaging techniques, also well known in the art.

It is further contemplated that the avatar may be processed within the video game in a way that enables the face of the avatar to look in a direction of the user when the user moves proximate to the avatar. For example, in the second VR scene 110, friend avatars 112 and 114 are shown to have faces that look in the direction of the user as the user drives toward the friend avatars 112 and 114. Furthermore, friend avatars 112 and 114 appear to be making eye contact with the user, making their presence more appealing and realistic. Thus, it is contemplated that the avatars discussed here may be caused to have their eyes follow the user, such that when the user looks toward the avatar, the avatar appears to make eye contact with the user.

According to various embodiments, friend avatars are contemplated to be three-dimensional (3D) virtual objects within the video game. Thus, for example, the inserted avatars may appear to occupy a 3D space within the game and move in three-dimensions.

Figure 3:
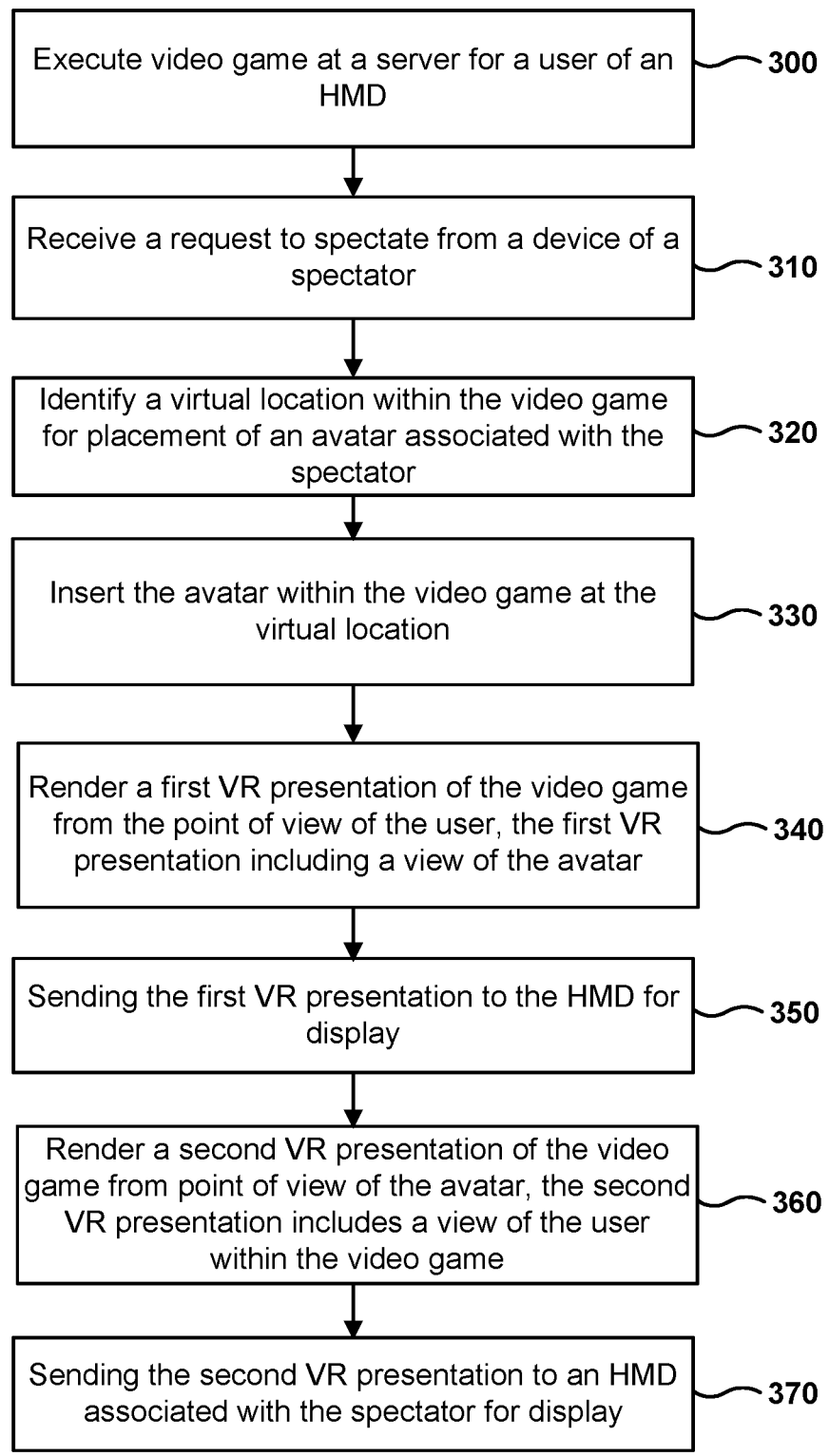
FIG. 3 shows an overall flow of a method for augmenting a VR video game with an avatar of a friend and providing a spectator view of the video game to the friend, according to one embodiment.

FIG. 3 shows an overall flow of a method for augmenting a VR video game with a friend avatar and providing a spectator view of the video game to the friend associated with the friend avatar, according to one embodiment. In operation 300, the method executes a video game at a server for a user of an HMD. In operation 310, the method receives a request to spectate from a device of a spectator. The method then identifies a virtual location within the video game for placing an avatar associated with the spectator in operation 320. The method in operation 330 then inserts the avatar associated with the spectator within the video game at the virtual location identified in operation 320.

The method shown in FIG. 3 then flows to operations 340 and 350, which serve to render a first VR presentation of the video game from the point of view of the user, the first VR presentation including a view of the avatar associated with the spectator, and to send the first VR presentation to the HMD for display, respectively. Further, the method also provides for operations 360 and 370, which serve to render a second VR presentation of the video game from a point of view of the avatar, the second VR presentation includes a view of the user within the video game, and to send the second VR presentation to an HMD associated with the spectator for display. As a result, the method of FIG. 3 is able to provide a spectator view to a spectator from a vantage point associated with an avatar associated with the spectator. The user is able to see the avatar as the user navigates the video game, and the spectator reciprocally sees the user within the video game in real time.

FIG. 3 also demonstrates that augmentation of avatars to video games need not involve removing an existing generic spectator. It is therefore contemplated that in certain embodiments, avatars may be inserted into video games where no generic spectator previously existed as well as into video games that do not include generic spectators. Thus, method and systems provided here may be implemented for video games having existing generic spectators and those that do not.

Figure 4:
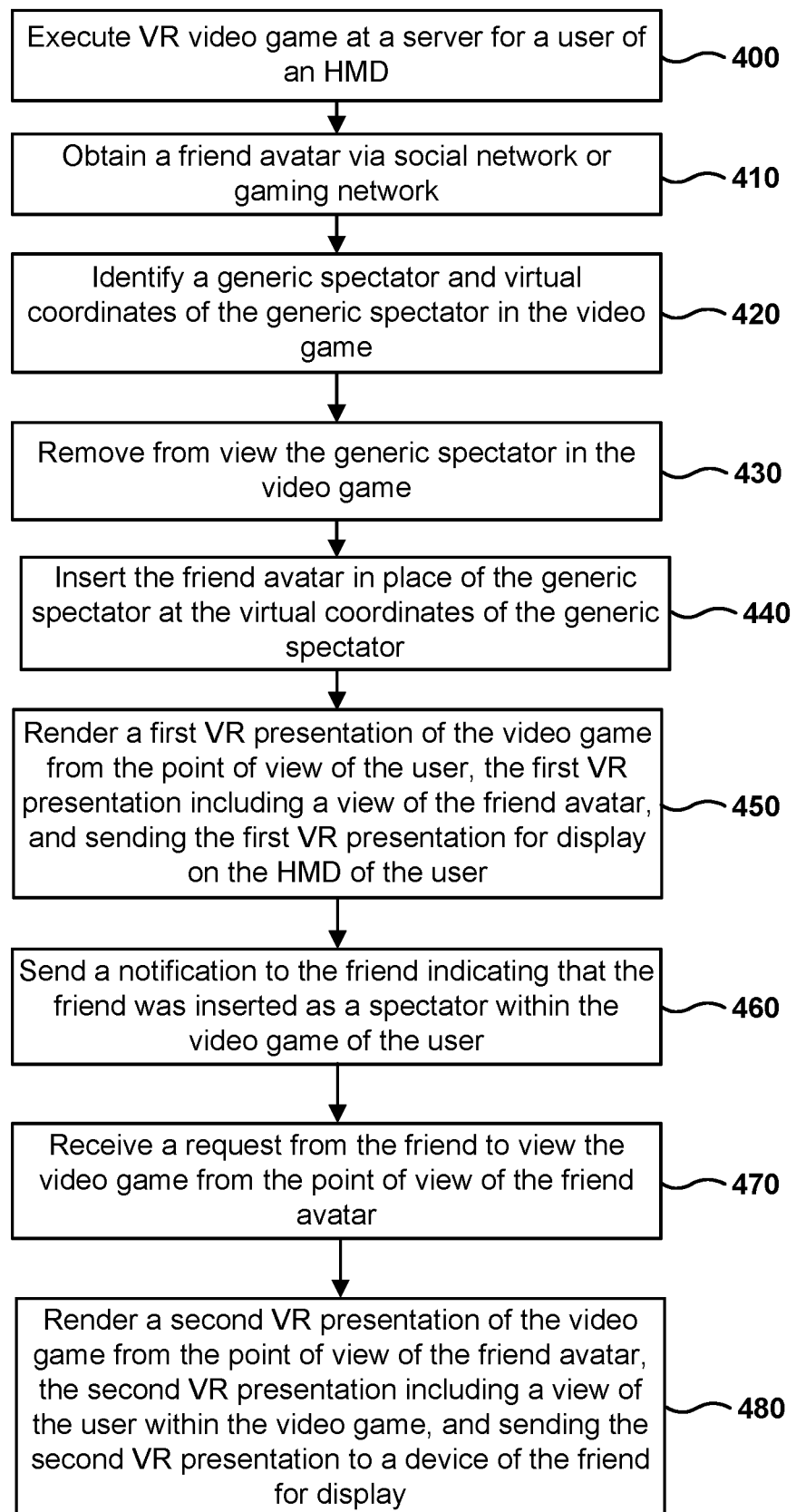
FIG. 4 shows another embodiment of a method for augmenting a VR video game with a friend avatar and rendering a first VR presentation for the player having a view of the friend avatar and rendering a second VR presentation for the friend having a view of the player.

FIG. 4 shows another embodiment of a method for augmenting a VR video game with a friend avatar and rendering a first VR presentation for the player having a view of the friend avatar and rendering a second VR presentation for the friend having a view of the player. The method proceeds by executing a VR game at a server for a user of an HMD at operation 400. The method then obtains a friend avatar via social network or gaming network in operation 410. In operation 420, the method identifies a generic spectator associated virtual coordinates for the generic spectator in the video game. The method then removes from view the generic spectator and inserts the friend avatar in place of the generic spectator at the virtual coordinates of the generic spectator in operations 430 and 440, respectively. The method is then configured to render a first VR presentation of the video game from the point of view of the user, the first VR presentation including a view of the of the friend avatar, and to send the first VR presentation for display on the HMD of the user.

The method of FIG. 4 is also able to send a notification to the friend associated with the friend avatar indicating that the friend was inserted as a spectator within the video game of the user in operation 460. The method is then able to receive a request from the friend to view the video game from the point of view of the friend avatar in operation 470. Further, in operation 480, the method is configured to render a second VR presentation of the video game from the point of view of the friend avatar where the second VR presentation includes a view of the user within the video game. Operation 480 is further configured to send the second VR presentation to a device of the friend for display. As a result, the friend associated with the friend avatar that is inserted into the video game may choose to view a VR presentation of the player within the video game after the friend is notified that the friend has been previously inserted into the video game.

Figure 5:
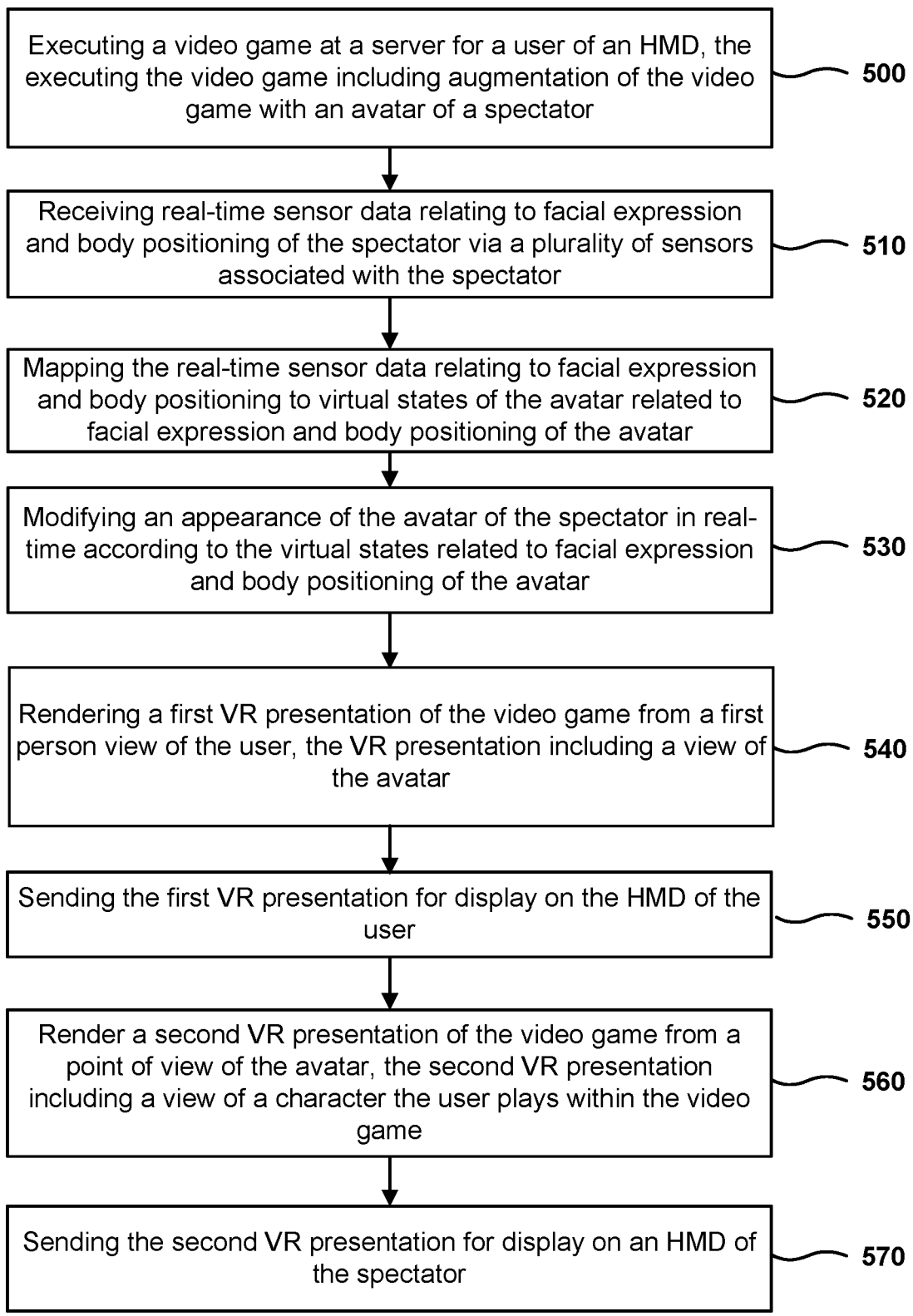
FIG. 5 shows an overall flow of a method for augmenting a VR video game with an avatar associated with a real world spectator, the avatar changing in appearance in real-time based on real world states of the real world spectator.

FIG. 5 shows an overall flow of a method for augmenting a VR video game with an avatar associated with a real world spectator, the avatar changing in appearance in real-time based on real world states of the real world spectator. The method proceeds in operation 500 by executing a video game at a server for a user of an HMD, wherein the executing the video game includes augmentation of the video game with an avatar of a spectator. In operation 510, the method receives real-time sensor data relating to facial expression and body positioning of the spectator via a plurality of sensors associated with the spectator. The method the flows to operation 520, which serves to map the real-time sensor data to virtual states of the avatar related to facial expression and body position of the avatar. In operation 530, the method then modifies an appearance of the avatar of the spectator in real-time according to the virtual states of the avatar relating to facial expression and body positioning of the avatar.

The method shown in FIG. 5 then flows to operations 540 and 550, which serve to render a first VR presentation of the video game from a first person view of the user, the first VR presentation including a view of the avatar, and to the first VR presentation for display on the HMD of the user, respectively. The method further includes operations 560 and 570, which serve to render a second VR presentation of the video game from a point of view of the avatar, the second VR presentation including a view of a character the user plays within the video game, and to send the second VR presentation for display on an HMD of the spectator. As a result, the method shown in FIG. 5 is able to augment the video game played by a user with a real-time representation of the spectator by using real-time sensor data relating to facial expression and body positioning. For example, if the spectator is cheering with their hands up in the real world, the method is able to a view of an avatar associated with the spectator that is cheering with its hands up.

Figure 6:
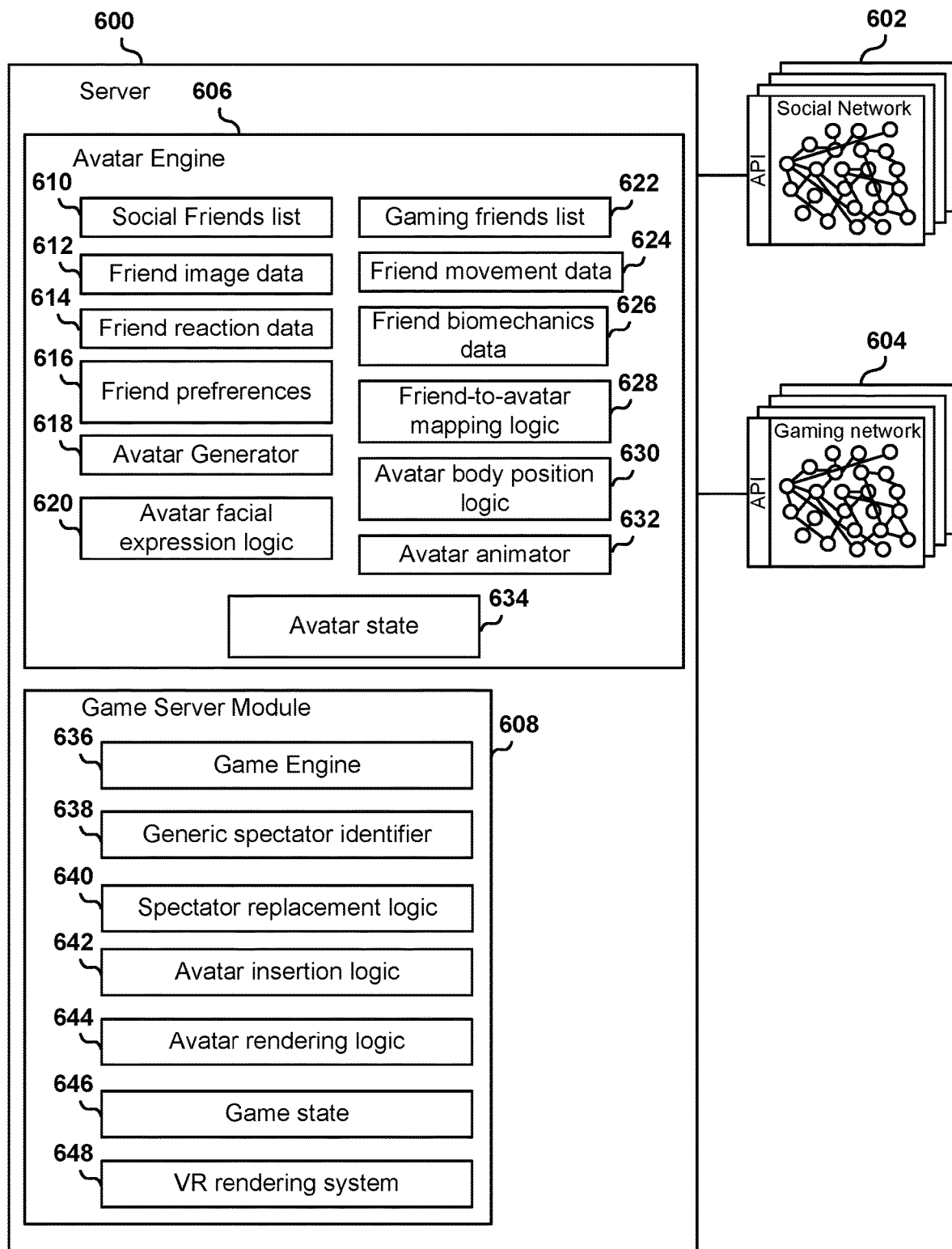
FIG. 6 shows a conceptual diagram of a server that enables augmentation of video games with friend avatars, according to one embodiment.

FIG. 6 shows a conceptual diagram of a server 600 that enables augmentation of video games with friend avatars, according to one embodiment. The server 600 is shown to communicate with one or more social networks 602 and one or more gaming networks 604. The server 600 includes an avatar engine 606 that enables avatars of friends from the one or more social networks 602 and/or the one or more gaming networks 604 to be drawn. As non-limiting examples, the avatar engine 606 is shown to include a social friend list 610 obtained via the one or more social networks 602, friend image data 612, friend reaction data 614, friend preferences 616, avatar generator 618, avatar facial expression logic 620, gaming friends list 622 obtained via the one or more gaming networks 604, friend movement data 624, friend biomechanics data 626, friend-to-avatar mapping logic 628, avatar body position logic 630, avatar animator 632, and avatar state 634.

According to various embodiments, friend image data 612 may include a plurality of images captured for a given friend that is usable to be mapped to an avatar. Friend image data 612 may include images of the friend's face as well as the friend's entire person. Friend image data 612 may also include images captured in real-time for real-time mapping of the friend's real world state to the friend avatar's virtual state. In other embodiments, it is contemplated that friend image data 612 may be used for dynamic mapping of real world states to friend avatar virtual states that is not necessarily in real-time. For example, images included in the friend image data 612 may be used to construct a set of virtual states that correspond to a number of types of reactions or behaviors of the friend. The set of virtual states may then be animated and rendered within one or more video games depending on the circumstances of the video game.

According to various embodiments, friend reaction data 614 may also include image data that corresponds to a given friend's reactions while playing or spectating a video game. For example, friend reaction data 614 may include data relating how a specific friend appears when the friend is cheering a fellow player on. Friend reaction data 614 may also include data relating how the friend appears when the friend is shocked, impressed, unimpressed, calm, excited, encouraging, discouraging, etc.

According to various embodiments, friend preferences 616 may include preference setting of the friend that relate to how the friend wishes to their avatar to be perceived. Friend preferences 616 may allow a friend to choose between different avatars and how closely the avatar is to resemble the likeness of the friend, as well as to modify the features of the avatar for display. In some embodiments, the friend may want a realistic avatar that resembles the friend as closely as possible. In other embodiments, the friend may instead choose a character that the friend wishes to appear as that does not necessarily resemble the friend. The friend may further modify any external features of the avatar to appear as desired.

Based on the friend image data 612, the friend reaction data 614, and the friend preferences data 616, the avatar generator 618 may be able to generate a friend avatar specific to the friend. For example, it is contemplated that avatar generator 618 is able to draw an avatar based on the friend image data 612, the friend reaction data 614, and friend preferences 616 using 3-dimensional modeling techniques that are well known in the art.

According to various embodiments, friend movement data 624 and friend biomechanics data 626 include data related to how the friend tends to move in the real world. Friend movement data 624 and biomechanics data 626 may be used by the friend-to-avatar mapping logic 628, which serves to map movements of the friend in the real world to virtual movements of the friend avatar. For example, if the friend pumps their fists in a certain way, the friend-to-avatar mapping logic 628 would be able to map the movement to the avatar such that the avatar pumps its fists in similar way.

According to various embodiments, avatar facial expression logic 620 serves to generate facial expressions in the avatar that correspond to facial expressions of the friend that is extracted from friend image data 612 and friend reaction data 614. For example, the avatar facial expression logic 620 may be able map a friend's expression of encouragement to the avatar such that the avatar exhibits a similar expression of encouragement. Moreover, avatar body position logic 630 serves to provide body position coordinates to the avatar. For example, if a friend strikes a pose, the avatar body position logic 630 may be able generate or modify the avatar such that the avatar appears to be striking a similar pose.

According to various embodiments, it is contemplated that avatars of friends may be dynamic objects within video games that having changing body positions and changing facial expression. Avatar animator 632 is shown to be one way in which to animate or to make dynamic an avatar of a friend. An avatar state 634 is shown to be produced as a result of the avatar engine 606. The avatar state 634 includes 3-dimensional data for drawing and rendering the avatar of the friend and corresponding avatar body positioning and facial expressions that may change in time.

Server 600 is also shown to include a game server module 608 that is responsible for executing a video game for a remote user. Although game server module 608 and avatar engine 606 are shown to be executed on the same server 600, it is to be understood that the game server module 608 and the avatar engine 606 may be executed on different servers, or that certain components of the avatar engine 606 may be executed on the game server module 608. The game server module 608 is shown to include a game engine 636 for executing various instructions of a given video game, a generic spectator identifier 638 for identifying a generic or "fake" spectator within the video game, a spectator replacement logic 640, an avatar insertion logic 642, an avatar rendering logic 644 for rendering avatars of friends within the video game, a game state 646, and a VR rendering system 648 for generating a VR presentation of the game state that is displayable on an HMD.

According to various embodiments, generic spectator identifier 638 is contemplated to be able to selectively identify generic spectators for the spectator replacement logic 640. According to some embodiments, there may be generic spectators within video games that are predetermined to be subsequently replaced. In other embodiments, the generic spectator identifier 638 is responsible for identifying one or more generic spectators that are optimal for replacement. For example, it is envisioned that the generic spectator identifier 638 may be enabled to identify spectators that have greater prominence based on the generic spectator's location within the video game, the relative distance between the generic spectator and the player of the video game, the number of pixels the generic spectator would occupy from a point of view of the player, the region of within a player's field of view that the generic spectator would be in, etc. Based on the some or all of the foregoing factors, the generic spectator identifier 638 is able to identify a generic spectator that when replaced with a friend avatar, would result in the friend avatar having greater visibility and prominence from a point of view of the player of the video game.

According to various embodiments, the spectator replacement logic 640 and the avatar insertion logic 642 serve to remove the generic spectator from view and to insert the friend avatar in its place, the friend avatar being defined by the avatar state 634. Moreover, avatar rendering logic 644 serves to render the avatar 644 as the game server module 608 executes the video game. The resulting game state 646 is rendered into VR presentation by VR rendering system 648, which is then transmitted to an HMD of the player for displaying the VR presentation. It should be noted that at least a portion of the components and processes shown in server 600 maybe performed on a computing device that is local to the player.

Figure 7A:
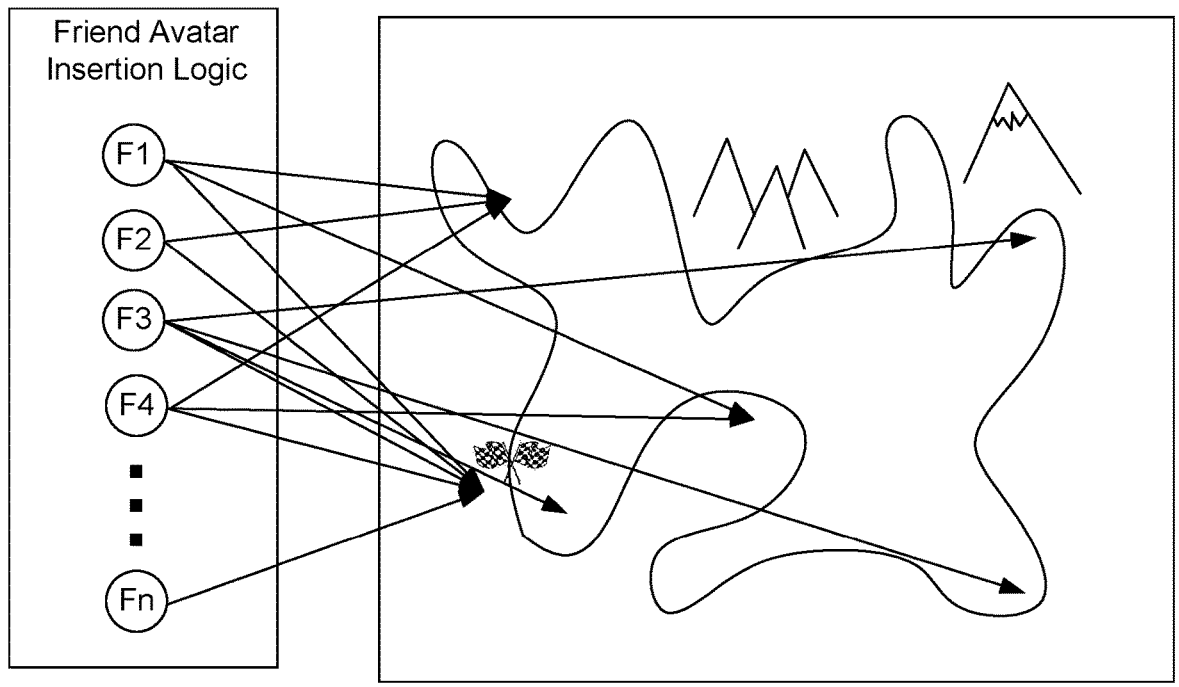
FIGS. 7A-7E show conceptual illustrations of friend avatar insertion logic and generic spectator replacement logic, according to various embodiments.

FIG. 7A shows a conceptual illustration of a friend avatar insertion logic that is enabled to insert a plurality of friends $F_1, F_2, \ldots, F_n$ to various locations within a racing game. In various embodiments, a friend avatar may be inserted into multiple locations for any given video game. For example, friend avatar $F_1$ is shown to be inserted into the racing game at three distinct locations. Moreover, as shown in FIG. 7A, multiple friend avatars may be inserted at a similar location. For example, each of friends $F_1, F_2, \ldots, F_n$ is shown to be inserted at a location within the racing game that corresponds to the finish line.

Figure 7B:
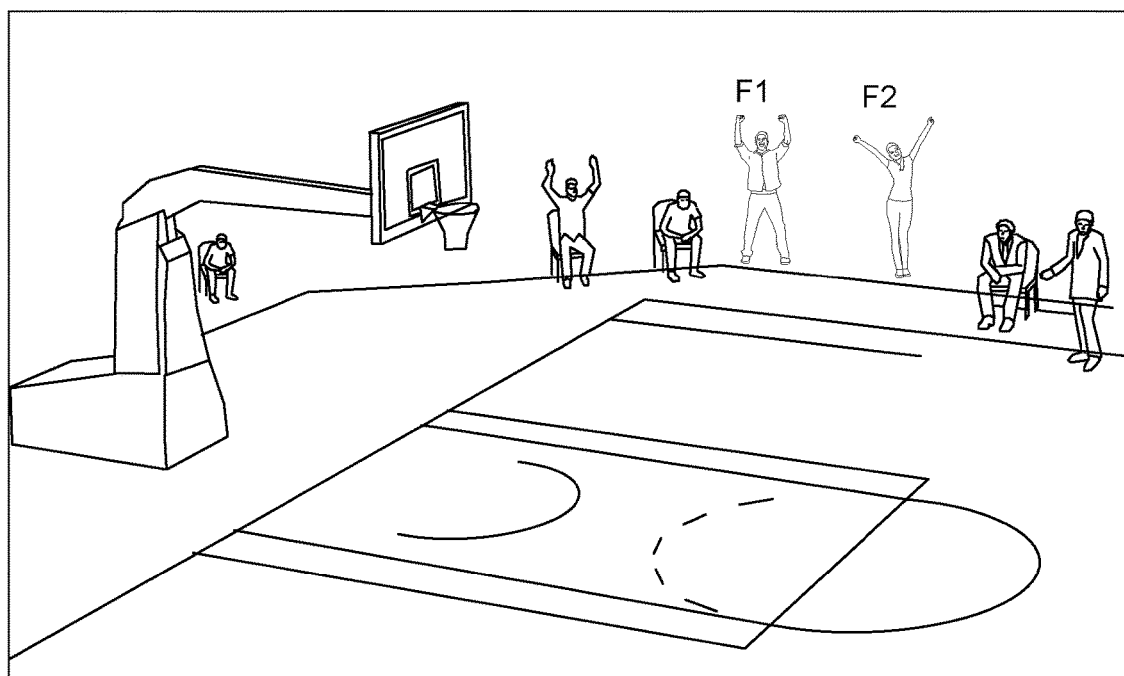

FIG. 7B shows an additional embodiment of how a spectator replacement logic and friend avatar insertion logic is envisioned to be implemented. FIG. 7B shows friend avatars $F_1$ and $F_2$ to be inserted at very prominent locations on the sideline of a basketball court. Thus, it is contemplated that the spectator replacement logic and friend insertion logic is able to identify regions within the video game where friend avatars, when inserted, appear prominently to a player of the video game. Moreover, it is contemplated that the friend avatars are to appear at a size that is proportional to the generic spectators that they replace, as well as to additional generic spectators proximal to the friend avatars. For example, friend avatars $F_1$ and $F_2$ are shown to be rendered at a size that is roughly proportional to other generic spectators in the region. However, this need not be the case. For example, in other embodiments, friend avatars may be "blown up" or magnified to appear larger than a generic spectator that is replaced.

Figure 7E:
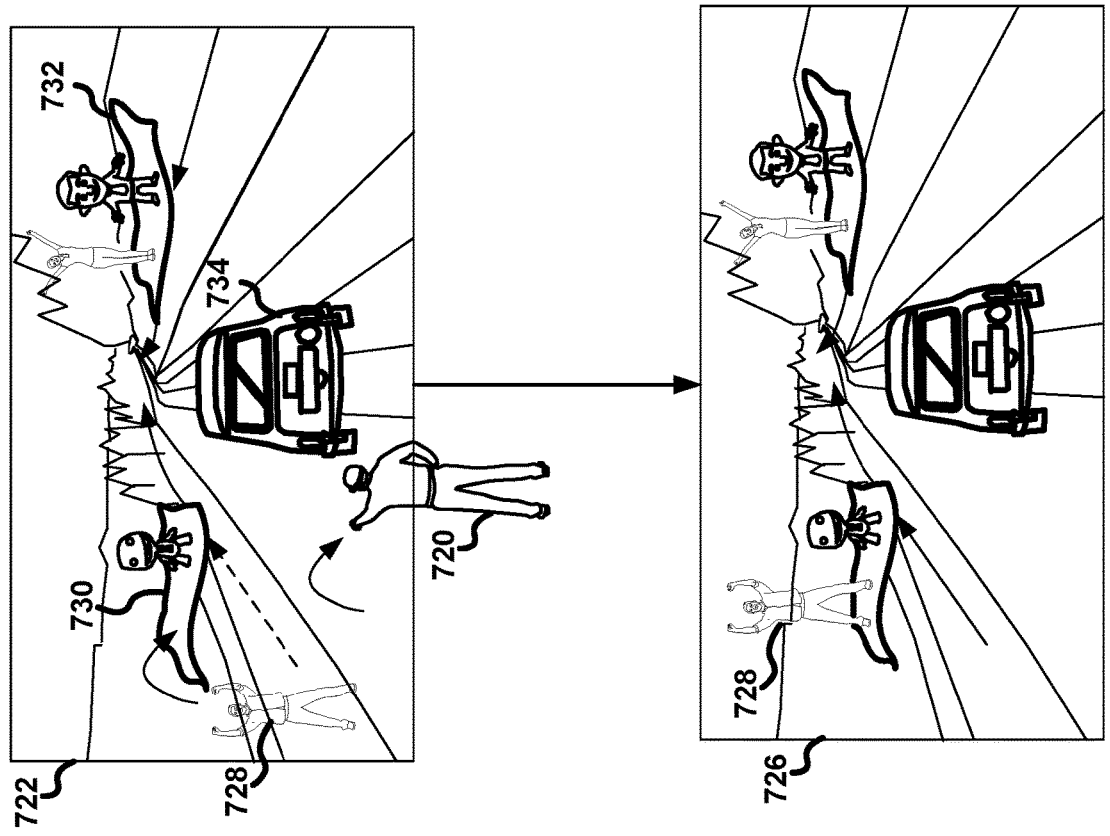
Figure 7C:
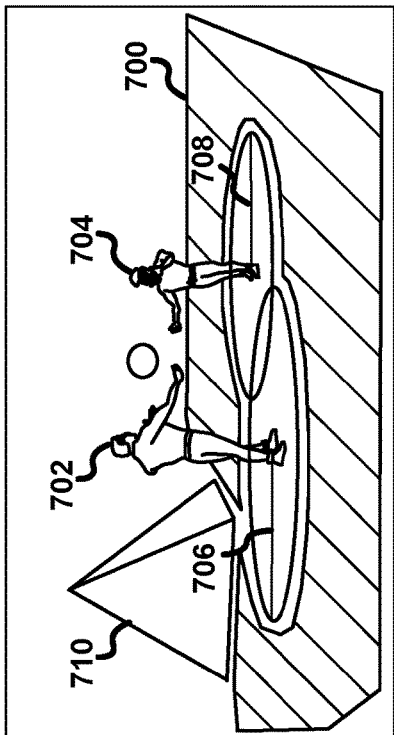
Figure 7D:
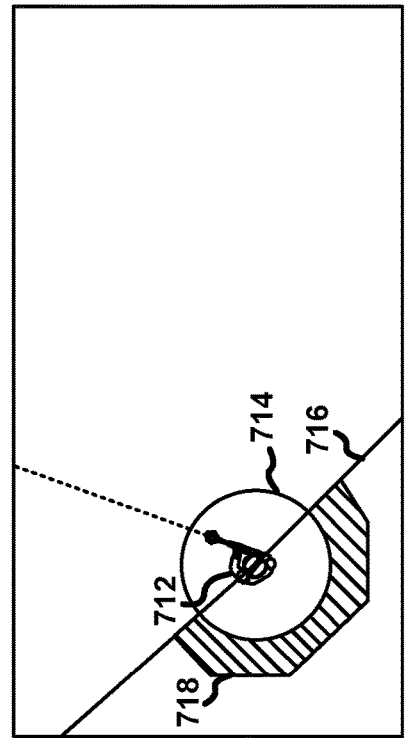

FIGS. 7C and 7D show embodiments of how to insert a friend avatar if there are not necessarily any generic spectators present. Specifically, FIGS. 7C and 7D show regions denoted by shaded areas where friend avatars may be inserted without necessarily replacing an existing generic spectator. In FIG. 7C, the friend avatar insertion area 700 (e.g., denoted by shaded area) takes into account the space needed for the player 702 and player 704 to perform actions within the video game. Thus, the friend avatar insertion area 700 is shown to not extend into a region having radius 706 of the player 702 or radius 708 of player 704. Moreover, friend avatar insertion area 700 is shown account for virtual object 710 and does not insert friend avatars into spaces occupied by virtual objects in some embodiments FIG. 7D shows a friend avatar insertion area 718 (e.g., shaded area) that may be used by an avatar insertion logic for a first person action game. Player 712 shown to be associated with a boundary 714 that delineates a region in which friend avatars should not be inserted. Moreover, a boundary 716 delineates between an action area, where the player 712 is expected to perform first person action (e.g., aiming or shooting), and a non-action area, where player 712 is not expected to be performing first person action. As a result, the friend avatar insertion area 718 is shown to be bound by boundary 714 and boundary 716 in order to not insert friend avatars at locations that would disrupt or distract performance of first person action by player 712. In many instances, the friend avatar insertion area 718 may change as player 712 progresses within a game. Likewise, it is contemplated that boundary 714 and boundary 716 may also change depending on progression within the game and also depending on user preference. For example, friend avatar insertion area 718 may increase or decrease in size, may change locations, and may take on a different shape depending on changes to boundary 714 and boundary 716. Moreover, the friend insertion area 718 may 'tag along' with player 712 as the player 712 moves within the video game (e.g., follow the player around).

FIG. 7E shows an additional embodiment of a friend avatar insertion logic that enables dynamic friend avatar insertion areas as well as user placement. As mentioned above, a player's movement within a virtual terrascape, a virtual world, or a virtual scene may occur fast enough such that it may be difficult to resolve or identify spectators that are standing still. For example, players often reach great speeds in racing games, making it difficult for the players to identify or make out individual spectators. According to an additional embodiment, it is contemplated that friend avatar insertion areas may be executed to be dynamic areas that move in synchrony with a player as the player moves through a video game. For example, in the embodiment shown in FIG. 7E, a first magic carpet 730 and a second magic carpet 732 are shown to be dynamic insertions areas. Thus, as player 720 drives car 734 within the video game, the magic carpets 730 and 732 may move in synchrony with the movement of the car 734 in a way that allows player 720 to have a consistent view of the friend avatars shown.

Moreover, in the embodiment shown, player 720 is able to choose how to place friend avatars. For example, player 720 is shown to place friend avatar 728 on magic carpet 730 in scene 722. In the resulting scene 726, friend avatar 728 is shown to be riding on magic carpet 730, allowing the player 720 to maintain a consistent view of friend avatar 728 throughout their video game experience if they so choose.

Figure 8:
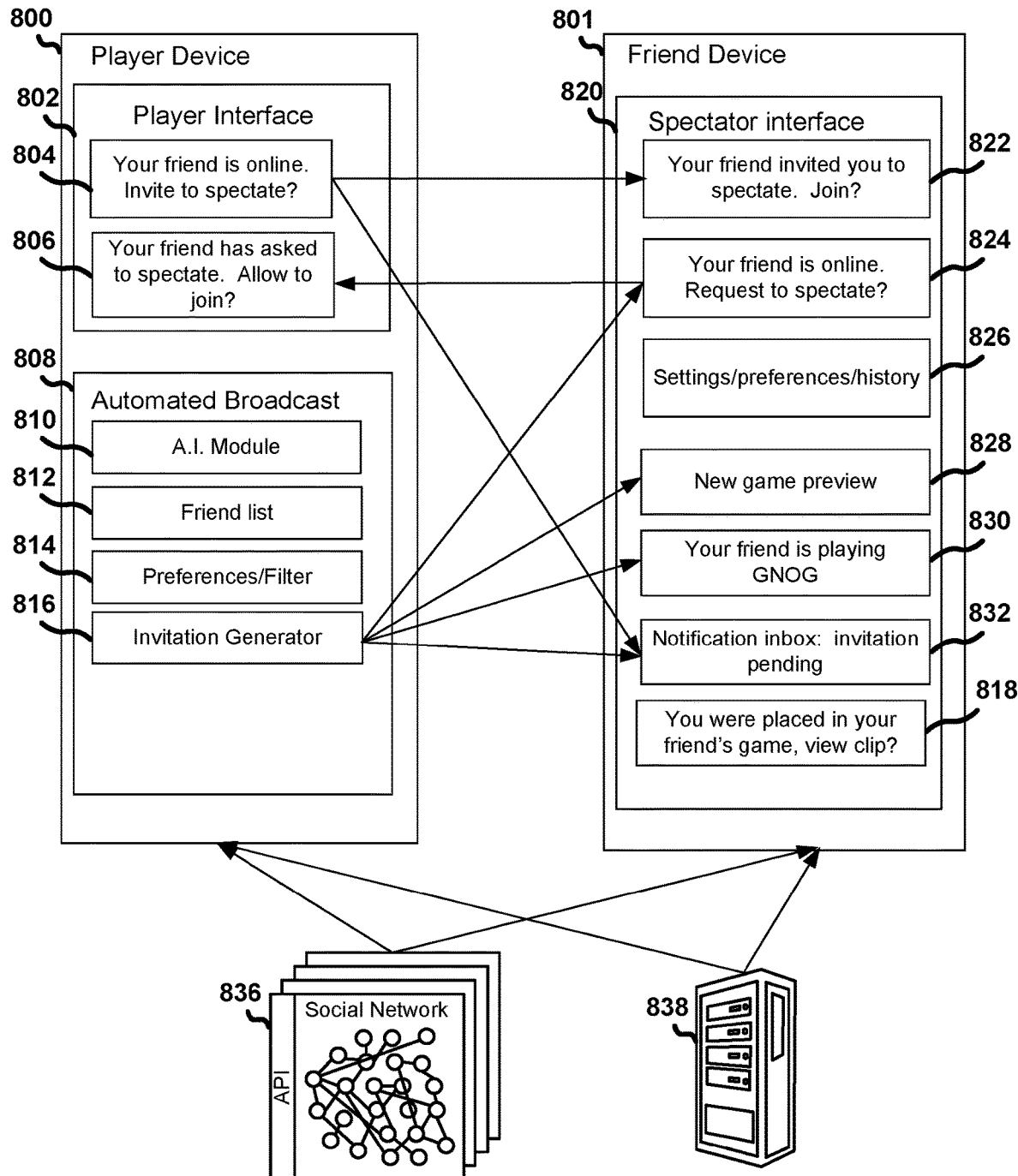
FIG. 8 shows a conceptual diagram showing ways to enable spectators to connect with players, according to one embodiment.

FIG. 8 shows a conceptual diagram showing ways to enable spectators to connect with players, according to one embodiment. Player device 800 and friend device 801 are shown to communicate via social network 836 and/or gaming server 838. In one embodiment, player device 800 includes a player interface 802 that allows the player to send an invitation 804 to friend device 801. The invitation 804 is displayed on a spectator interface 820 as an invitation to spectate 822, which allows the friend to join a player's game. The invitation to spectate 822 may be displayed in a number of ways, such as a pop-up notification while the friend is browsing the internet, while interacting with a social network, or while playing a game. Player interface 802 also may display a request 806 that originates from a request to spectate 824 selected by the friend on the friend device 801.

Player device 800 may also include an automated broadcast 808 that includes an artificial intelligence (A.I.) module 810, a friend list 812, a preferences/filter 814, and an invitation generator 816. It is contemplated that invitations to friends may be generated automatically based on the A.I. module 810, the friend list 812, the preferences/filter 814, and the invitation generator 816 in a selective way that accounts for whom the player wants inserted. Invitation generator 814 may notify the friend device 801 to generate the request to spectate 824, a new game preview 828, if for example the player is to play a newly released game, a direct notification 830, or a message that is sent to an invitation inbox 832. The spectator interface 820 is also shown to include a settings/preferences/history 826 that helps to determine which players and/or games the friend is likely to be interested in for spectating. Further, if a friend is automatically inserted into a player's video game at some point in the past, a notification 818 may be sent to the friend device 801 that allows the friend to playback a clip of the video game that the friend was inserted into. It should be noted that some or all of the operations or components of the automated broadcast 808 may be executed on social network 836 or gaming server 838 or other suitable server.

Figure 9:
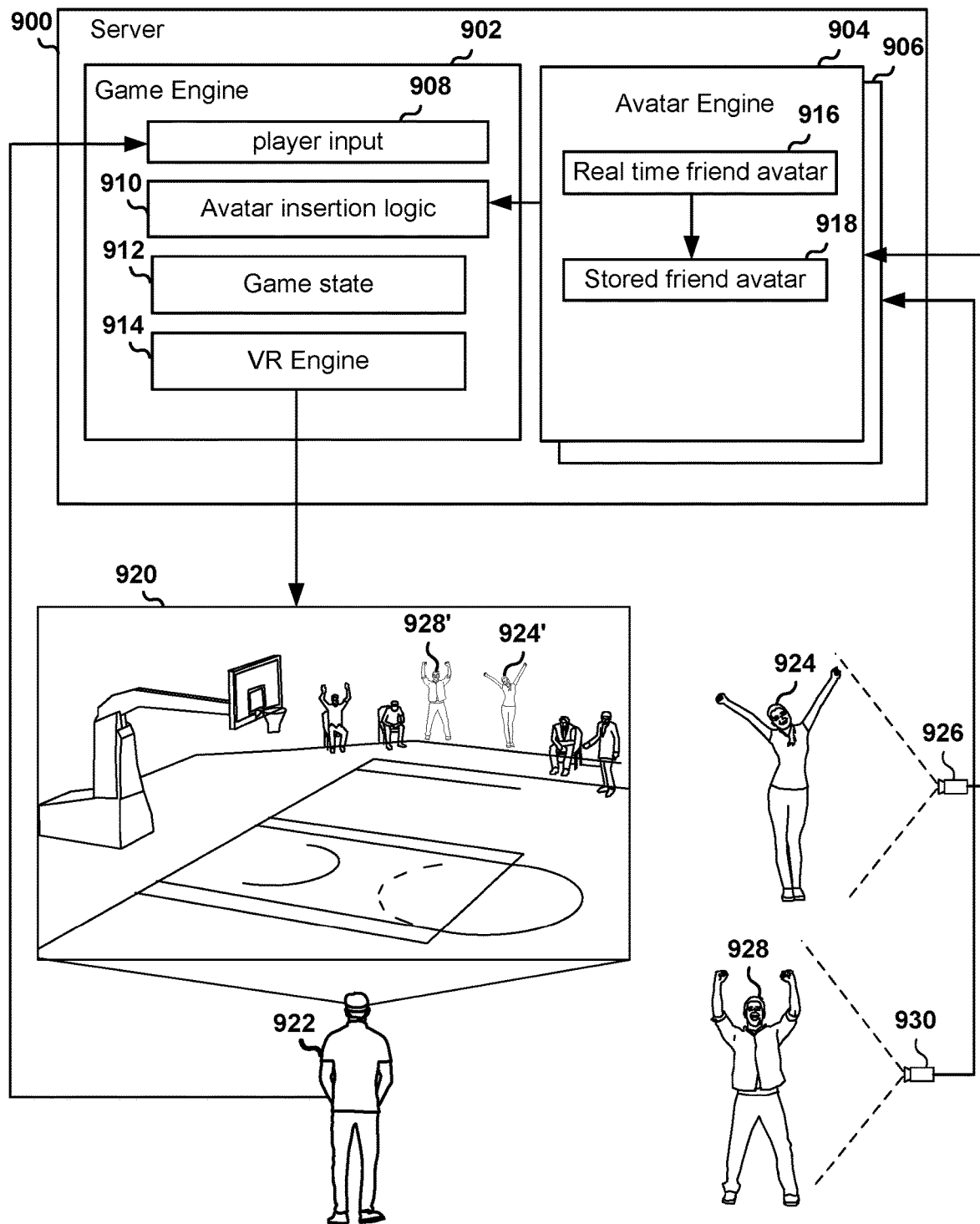
FIG. 9 shows a conceptual illustration of a method for augmenting friend avatars using captured image data of friends, according to one embodiment.

FIG. 9 shows a conceptual illustration of a method for augmenting friend avatars using captured image data of friends, according to one embodiment. In the embodiment shown, a server 900 includes a game engine 902 and an avatar engine 904 for friend 924 and an avatar engine 906 for friend 928. Image capture devices 926 and 930 are shown to capture image data of friend 924 and friend 928, respectively. Image capture data is shown to be communicated with the avatar engines 904 and 906, which are configured to generate a real time friend avatar 916 and/or a stored friend avatar 918. Real time friend avatar 916 is a representation of friend 924 or 928 in real time, the real time friend avatar 916 changing in appearance as friends 924 or 928 exhibit changes to their appearances in the real world. The stored friend avatar 918 may be a dynamic virtual object defined by a set of avatar states and movements and may be used when real time image capture data of a friend is not available. Thus, it is contemplated that avatar engine 904 is able to construct a stored friend avatar having an 'avatar space' defined by various states of facial expression and body positioning that mapped from image capture data. An 'avatar space' may, for example, include a set of all of the avatar states in terms of facial expression and body positioning as informed by image capture data. As a result, an 'avatar space' for a given stored friend avatar may be expanded by capturing additional real world states of a friend. Avatar states conveyed by real time friend avatar 916 may be added to the universe avatar states of the stored friend avatar 918.

Avatar engine 904 is shown to communicate real time friend avatar 916 or stored friend avatar 918 to avatar insertion logic 910 of the game engine 902. As discussed hereinabove, the avatar insertion logic 910 may identify a generic spectator and insert the real time friend avatar 916 or the stored friend avatar 918 in its place. Game engine 902 further receives player input 908 from player 922. A resulting game state 912 is used by VR engine 914 to render a VR presentation 920 that includes friend avatars 924' and 928'. In some embodiments, it is envisioned that a portion of the inserted friend avatars may be real time friend avatars while another portion may be stored friend avatars.

Figure 10:
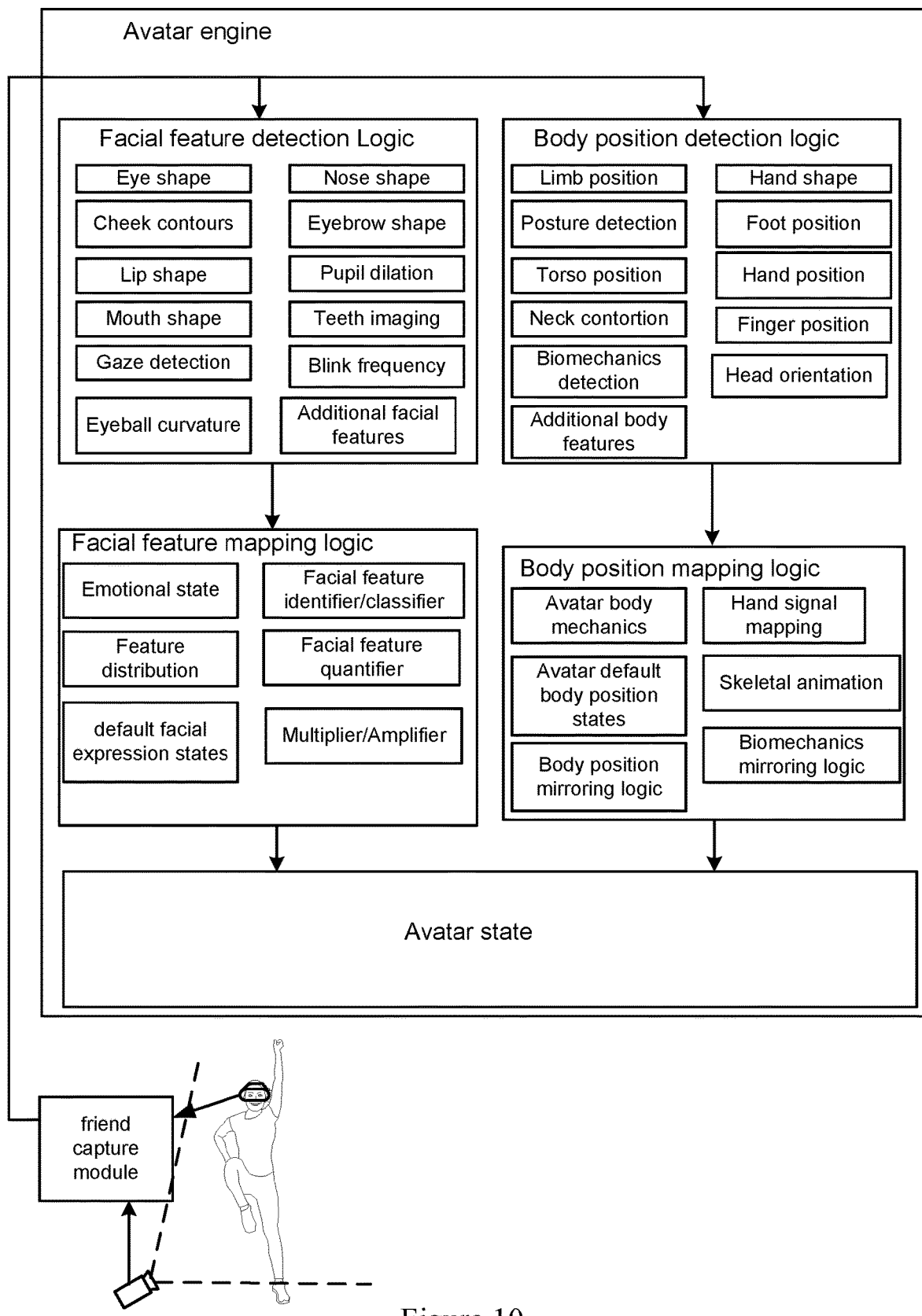
FIG. 10 shows an embodiment of an avatar engine that enables virtualization of real world friends into avatars.

FIG. 10 shows additional components of an avatar engine that may be used to enable virtualization of real world friends, according to one embodiment. Avatar engine is shown to include facial feature detection logic and body position detection logic. Facial feature detection logic is shown to be able to capture eye shape, nose shape, cheek contours, eyebrow shape, lip shape, pupil dilation, mouth shape, teeth imaging, gaze, blink frequency, eyeball curvature, among other additional facial features. Body position detection logic is shown to be able to detect limb position, foot position, torso position, neck position, hand position, finger position, posture, biomechanics, head orientation, and additional body features.

Facial feature mapping logic is shown to map data from the facial feature detection logic to avatar states. Facial feature mapping logic includes operations and components related to determining a friend emotional state, identifying and classifying facial features, quantifying facial features, and to multiply and/or amplifying various facial features. The multiplier/amplifier may, in some embodiments, enhance a friend's facial features to make them more obvious in appearance with respect to a resulting avatar. The facial feature mapping logic also includes components related to determining how various facial features are distributed over time (e.g., how often a friend smiles and for how long the friend smiles on average). Furthermore, the facial feature mapping logic includes a default facial expression state, which may define a friend's baseline or resting facial expression.

Body position mapping logic is shown to map data obtained from the body position detection logic to avatar states. Body position mapping logic includes components and operations related to avatar body mechanics, hand signal mapping, avatar default body position states, body position mirroring logic, biomechanics mirroring logic, and skeletal animation. The facial feature mapping logic and the body position mapping logic results in an avatar state that may resemble the friend in many ways with respect to facial features, body position, and movement.

Figure 11:
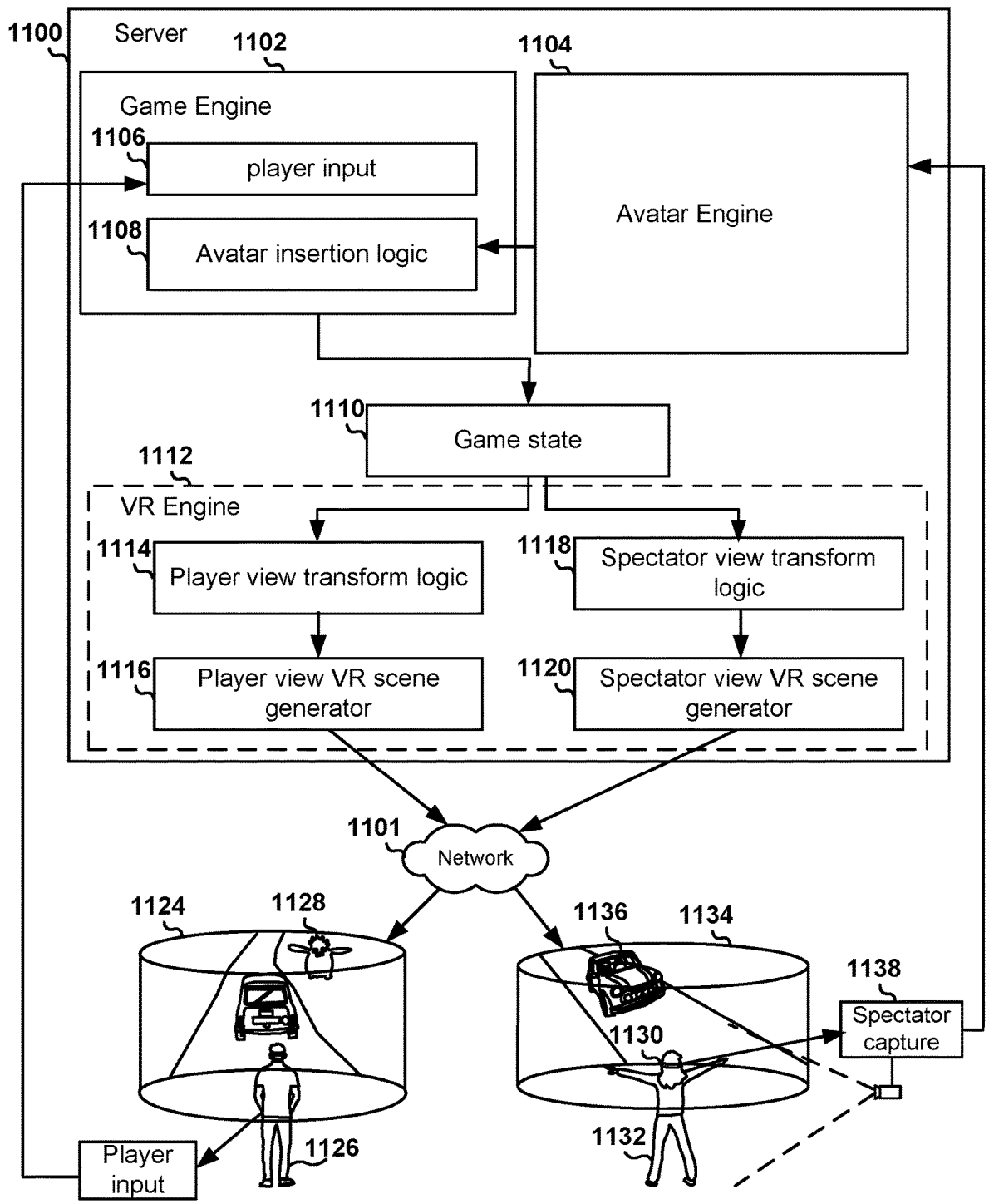
FIG. 11 shows a conceptual illustration for augmenting a video game of a player with an avatar of a friend and providing VR presentations of the video to both the player and the friend.

According to some embodiments, a friend who is inserted as an avatar into a player's game may wish to have a spectator view of the player's video game. FIG. 11 shows a conceptual illustration for augmenting a video game of player with an avatar and providing a spectator view of the video game for the friend associated with the avatar. Accordingly, a server 1100 is shown to include a game engine 1102, an avatar engine 1104 and a VR engine 1112. The avatar engine receives spectator capture data from spectator capture 1138 that includes HMD 1130 capture data in addition to image capture data of spectator 1132. HMD 1130 capture data may include some or all of the data components of facial feature detection logic of FIG. 10.

Game engine 1102 is shown to receive player input 1106 from player 1126 during interaction with a VR presentation 1124 of a racing game. Game engine 1102 also receives avatar data for the avatar insertion logic 1108 from the avatar engine 1104. A resulting game state 1110 is processed by a VR engine 1112 that includes player view transform logic 1114, a player view VR scene generator 1116, spectator view transform logic 1118, and a spectator view VR scene generator 1120. The player view transform logic 1114 and the player view VR scene generator 1116 produces the VR presentation 1124 that is displayed to the player 1126. As a result of the VR engine 1112, the VR presentation 1124 is shown to include a view of avatar 1128 that is based on spectator 1132. Moreover, the spectator view transform logic 1118 and the spectator view VR scene generator 1120 is shown to produce a spectator VR presentation 1134 that is delivered to HMD 1130 via network 1101. The spectator VR presentation 1134 is shown to include a view of a race car that player 1126 is driving from the point of view of the avatar 1128.

As noted above, some or all of the components of VR engine 1122 may be located or distributed across one or more different servers or user devices. For example, in some embodiments, the player view transform logic 1114 and the player view VR scene generator 1116 may be executed on a user device local to the player 1126 such as a game console, computing device, or at the HMD associated that the player 1126 wears for displaying the VR presentation 1124. Likewise, spectator view transform logic 1118 and spectator view VR scene generator 1120 may be executed on a device local to the spectator 1132 such as a game console or HMD 1130.

It should also be noted that illustration of FIG. 11 enables both real time spectator views as well as playback spectator views such as a spectator playback scene associated with notification 818 of FIG. 8.

Figure 12:
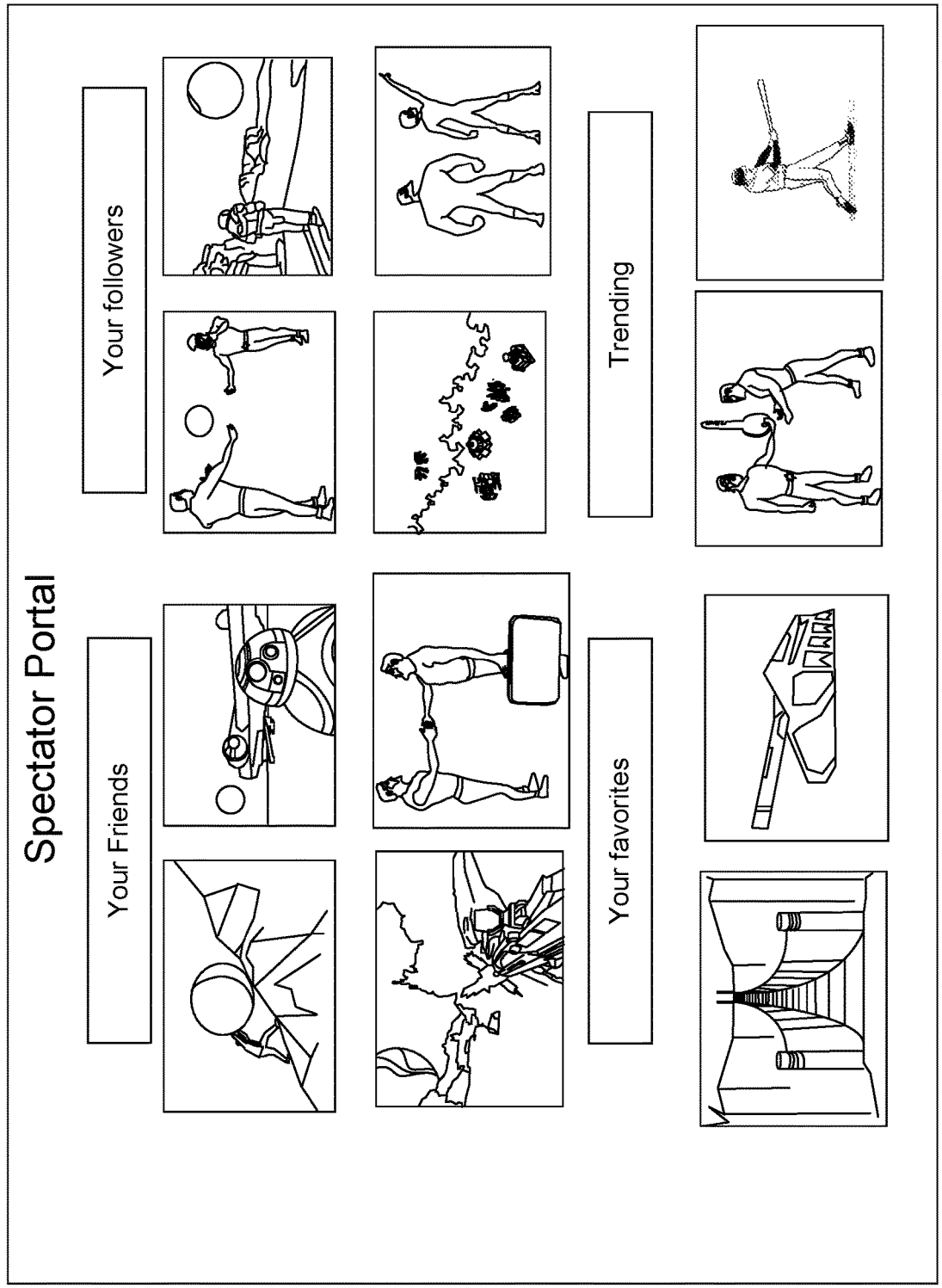
FIG. 12 shows an embodiment of an interface that may be used by a spectator to be inserted into various video games as an avatar.

FIG. 12 shows an embodiment of a spectator user interface that may be used to select between various video games to be inserted into for spectator views. The spectator user interface is shown to include thumbnail images or video images of video games being played various users, including video games played by friends and followers, video games that are favorites of the spectator, and video games that are trending.

Figure 13:
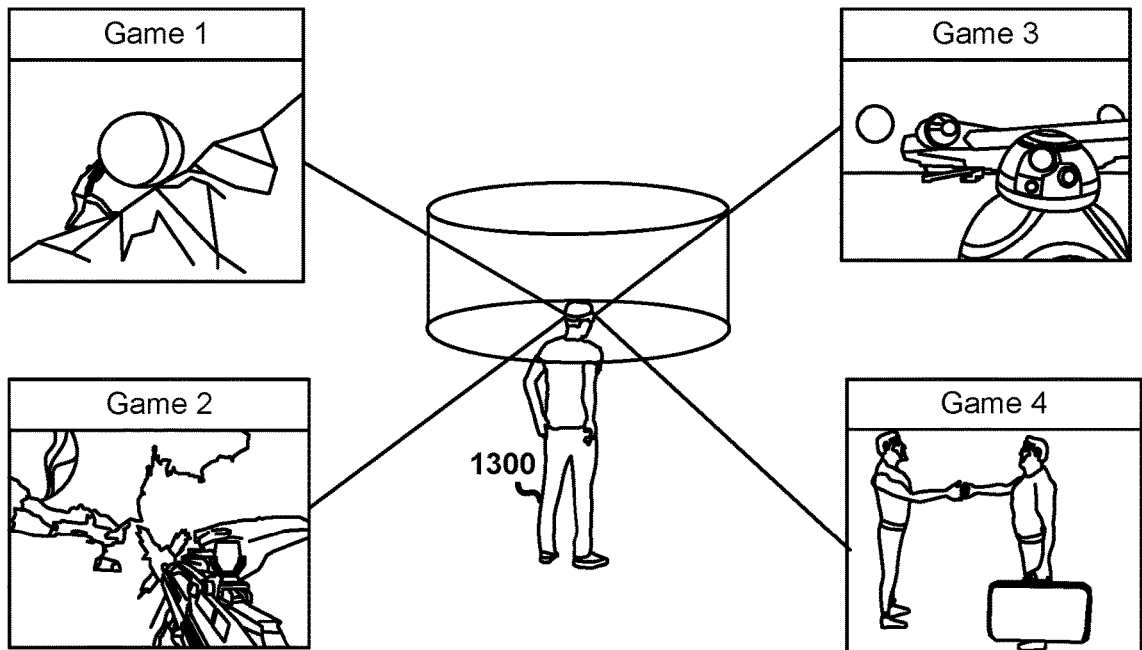
FIG. 13 shows an embodiment of implementing a spectator experience after the spectator has been augmented into multiple video games at once.
Figure 13:
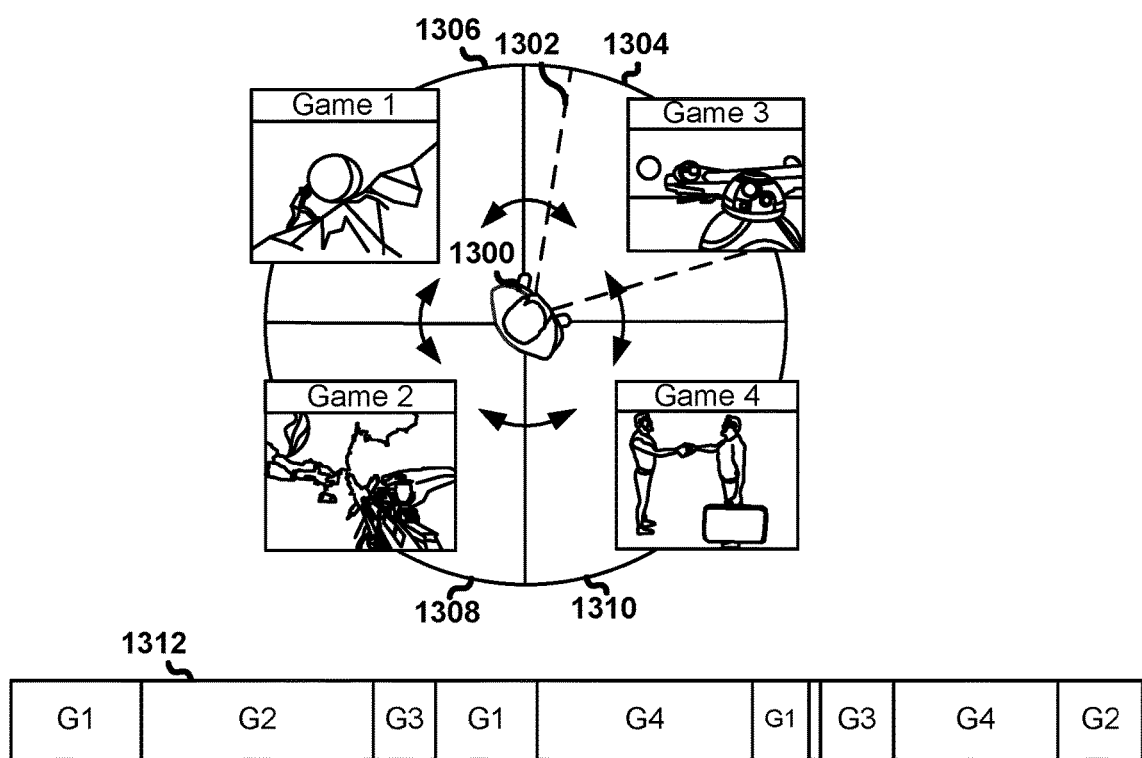

According to some embodiments, spectators may wish to be augmented into multiple games at once and obtain spectator views from each of the multiple games. FIG. 13 shows a conceptual illustration demonstrating a spectator experience after having been augmented into four games simultaneously. The spectator 1300 is shown to have been augmented into game 1, game 2, game 3, and game 4. According to some embodiments, the spectator 1300 is able to navigate between viewing the four ongoing video games by directing a field of gaze 1302 in various directions. For example, spectator 1300 is presented with game 1 when field of gaze 1302 is directed to region 1306, game 2 when field of gaze 1302 is directed to region 1308, game 3 when field of gaze 1302 is directed to region 1304, and game 4 when field of gaze 1302 is directed to region 1310. A resulting VR presentation 1312 is shown to be a sequence of clips from the four video games.

Figure 14:
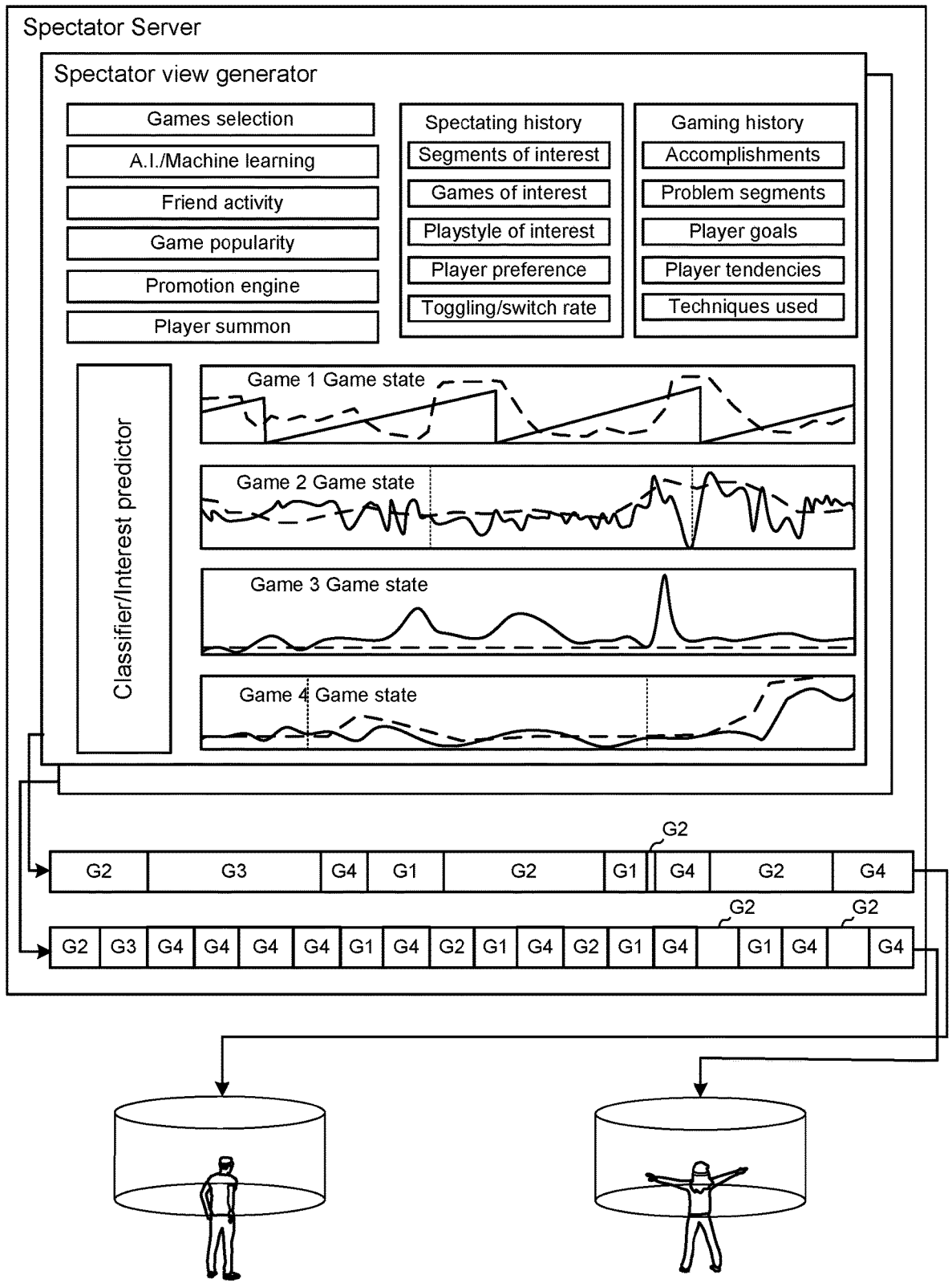
FIG. 14 shows an additional embodiment of implementing a spectator experience after the spectator has been augmented into multiple video games at once.

FIG. 14 shows an additional embodiment for automatically generating spectator views that toggle between multiple video games based on game states of the video games, user preferences, and user history, among other indicators. The spectator view generator is shown to include a games selection including the video games that the spectator has been augmented into (e.g., games 1, 2, 3, and 4), an A.I./machine learning module, friend activity, game popularity, a promotion engine (e.g., may promote newly released games), and play summon (e.g., a player may 'summon' the spectator to be 'present' for a particular segment). The spectator view generator also includes a spectating history that includes various indicators such as segments of interest, games of interest, playstyle of interest, player preference, and the spectator's toggle/switch rate between spectator views of different game. Additionally, a gaming history includes various indicators such as gaming accomplishments, gaming problem segments, gaming goals, gaming tendencies, gaming techniques used.

The spectator view generator also obtains game states for games 1-4. In the embodiment shown, the solid curve in each of the game states may represent game intensity, stages, levels, segments, etc. The dash line in each of the game states may represent game popularity, number of current viewers, etc. A classifier/interest predictor is then shown to generate a first and second spectator presentation, both of which include a sequence of segments from games 1-4. The first and second spectator views are shown to be delivered to a first and second spectator, respectively. The spectator presentations may differ depending on the spectator and the associated indicators for the spectator.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for augmenting a video game with an avatar of a real world person, the method comprising:
executing the video game at a server, the video game being played by a user via an HMD;
identifying a generic spectator within the video game;
determining virtual coordinates associated with the generic spectator;
receiving, at the server, data associated with the avatar of the real world person, the data usable to display the avatar within the video game;
removing the generic spectator from view in the video game;
inserting the avatar into the video game at the virtual coordinates associated with the generic spectator using the data associated with the avatar, the inserting the avatar causes the avatar to be viewable within the video game, the avatar is presented in a three-dimensional (3D) form;
rendering a virtual reality (VR) presentation of the video game for the user, the VR presentation includes a view of the avatar; and
sending the VR presentation to the HMD of the user for display;
wherein the identifying the generic spectator includes selecting the generic spectator from a plurality of generic spectators based on a level of visibility or prominence the generic spectator has with respect to a point of view of the user.

2. The method of claim 1, further comprising:
identifying one or more additional generic spectators;
determining respective virtual coordinates for the one or more additional generic spectators;
removing the one or more additional generic spectators from view within the game; and
inserting the avatar into the video game at the respective virtual coordinates associated with the one or more additional generic spectators, the inserting the avatar causes the avatar to be viewable in 3D form within the video game, wherein the VR presentation includes one or more additional views of the avatar at different locations with the video game.

3. A method for augmenting a video game with an avatar of a real world person, the method comprising:
executing the video game at a server, the video game being played by a user via an HMD;
identifying a generic spectator within the video game;
determining virtual coordinates associated with the generic spectator;
receiving, at the server, data associated with the avatar of the real world person, the data usable to display the avatar within the video game;
removing the generic spectator from view in the video game;
inserting the avatar into the video game at the virtual coordinates associated with the generic spectator using the data associated with the avatar, the inserting the avatar causes the avatar to be viewable within the video game, the avatar is presented in a three-dimensional (3D) form;
rendering a virtual reality (VR) presentation of the video game for the user, the VR presentation includes a view of the avatar; and
sending the VR presentation to the HMD of the user for display; and
reducing a speed of presentation of the video game while the avatar is viewable to the user; and
increasing the speed of presentation of the video game when the avatar is no longer viewable to the user.

4. The method of claim 1, further comprising:
identifying one or more additional generic spectators within the video game;
determining virtual coordinates associated with each of the one or more additional generic spectators;
receiving, at the server, data associated with one or more additional avatars of one or more real world persons, the data usable to display the one or more additional avatars within the video game, the one or more additional avatars are presented in 3D form;
removing the one or more additional generic spectators from view in the video game;
inserting, respectively, the one or more additional avatars into the video game at the virtual coordinates associated with the each of the one or more additional generic spectators, wherein the VR presentation includes the one or more additional avatars, the one or more additional avatars are in 3D form.

5. A method for augmenting a video game with an avatar of a real world person, the method comprising:
executing the video game at a server, the video game being played by a user via an HMD;
identifying a generic spectator within the video game;
determining virtual coordinates associated with the generic spectator;
receiving, at the server, data associated with the avatar of the real world person, the data usable to display the avatar within the video game;
removing the generic spectator from view in the video game;
inserting the avatar into the video game at the virtual coordinates associated with the generic spectator using the data associated with the avatar, the inserting the avatar causes the avatar to be viewable within the video game, the avatar is presented in a three-dimensional (3D) form;
rendering a virtual reality (VR) presentation of the video game for the user, the VR presentation includes a view of the avatar; and
sending the VR presentation to the HMD of the user for display; and
rendering an additional VR presentation of the video game for the real world person, the additional VR presentation having a point of view associated with the avatar; and
sending the additional VR presentation of the video game to a device of the real world person for display, wherein the additional VR presentation includes view of a character or object the user controls within the video game.

6. The method of claim 1, wherein the avatar of the real world person is constructed based on image capture data of the real world person.

7. The method of claim 6, wherein the avatar of the real world person includes facial features based on the image capture data of the real world person.

8. The method of claim 6, wherein an appearance of the avatar changes in real-time based on based on the image capture data of the real world person.

9. The method of claim 1, wherein the inserting the avatar into the video game occurs such that a front side of the avatar is viewable to the user in the VR presentation of the video game.

10. The method of claim 1, wherein the generic spectator is one or more of a fake spectator, a non-player character (NPC), non-person character, or other character not associated with real world persons.

11. The method of claim 1, wherein the avatar includes at least a virtual face resembling a face of the real world person as identified from a social media network.

12. The method of claim 1, wherein the avatar being viewable within the video game further enables a face of the avatar to look in a direction of the user when the user moves proximate to the avatar.

13. The method of claim 12, wherein said looking in the direction of the user causes eyes of the avatar to follow the user, such that when the user looks toward the avatar, the avatar appears to make eye contact with the user.

14. A server system, comprising:
one or more processors; and
a memory disposed in communication with the one or more processors and storing processor-executable instructions to:
execute a video game for play by a user via an HMD;
identify a generic spectator within the video game;
determine virtual coordinates associated with the generic spectator;
receive data associated with the avatar of a real world person, the data usable to display the avatar within the video game;
remove the generic spectator from view in the video game;
insert the avatar into the video game at the virtual coordinates associated with the generic spectator using the data associated with the avatar to cause the avatar to be viewable within the video game in a 3D form;
render a VR presentation of the video game for the user, the VR presentation includes a view of the avatar in the 3D form; and
send the VR presentation to the HMD of the user for display;
wherein the processor-executable instructions to identify the generic spectator within the video game includes instructions to select the generic spectator from a plurality of generic spectators based on a level of visibility or a prominence associated with the generic spectator with respect to the a point of view of the user.

15. The system of claim 14, further comprising instructions to:
reduce a speed of presentation of the video while the avatar is viewable to the user; and
increase the speed of presentation of the video game when the avatar is no longer viewable to the user.

16. The system of claim 14, further comprising instructions to:
identify one or more additional generic spectators within the video game;
determine virtual coordinates associated with each of the one or more additional generic spectators;
receive data associated with one or more additional avatars of one or more real world persons, the data associated with the one or more additional avatars usable to display the one or more additional avatars within the video game;
remove the one or more additional generic spectators from view in the video game; and
insert, respectively, the one or more additional avatars into the video game at the virtual coordinates associated with the each of the one or more additional generic spectators to cause the one or more additional avatars to be viewable within the video game in 3D form, wherein the VR presentation includes the one or more additional avatars.

17. The system of claim 14, further comprising instructions to:
render an additional VR presentation of the video game for the real world person, the additional VR presentation having a point of view associated with the avatar; and
send the additional VR presentation of the video game to a device of the real world person for display, wherein the additional VR presentation includes view a character or object the user controls within the video game.

18. The system of claim 14, wherein the avatar of the real world person includes at least a virtual face resembling a face of the real world person as identified from a social media network.

19. The system of claim 14, wherein the avatar being viewable enables a face of the avatar to look in a direction of the user when the user moves proximate to the avatar.

20. The system of claim 19, wherein said looking in the direction of the user causes eyes of the avatar to follow the user, such that when the user looks toward the avatar, the avatar appears to make eye contact with the user.

* * * * *